US008997887B2

(12) United States Patent
Furusawa et al.

(10) Patent No.: US 8,997,887 B2
(45) Date of Patent: Apr. 7, 2015

(54) POWER TOOL

(75) Inventors: Masanori Furusawa, Anjo (JP);
Yoshihiro Kasuya, Anjo (JP); Hajime Takeuchi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 659 days.

(21) Appl. No.: 13/139,875

(22) PCT Filed: Oct. 19, 2009

(86) PCT No.: PCT/JP2009/068002
§ 371 (c)(1),
(2), (4) Date: Aug. 31, 2011

(87) PCT Pub. No.: WO2010/070977
PCT Pub. Date: Jun. 24, 2010

(65) Prior Publication Data
US 2011/0308830 A1 Dec. 22, 2011

(30) Foreign Application Priority Data

Dec. 19, 2008 (JP) ................................. 2008-324774
Oct. 6, 2009 (JP) ................................. 2009-232754

(51) Int. Cl.
*B25D 17/04* (2006.01)
*B23Q 11/00* (2006.01)
(Continued)

(52) U.S. Cl.
CPC ............ *B25D 17/04* (2013.01); *B23Q 11/0046* (2013.01); *B25D 2211/003* (2013.01); *B25F 5/026* (2013.01); *B25F 5/003* (2013.01)

(58) Field of Classification Search
CPC ........................ B23Q 11/0046; B23Q 11/0071
See application file for complete search history.

(56) References Cited

U.S. PATENT DOCUMENTS 5,090,499 A * 2/1992 Cuneo ........................... 175/209
7,281,886 B2 * 10/2007 Stoerig ............................ 408/67
(Continued)

FOREIGN PATENT DOCUMENTS

| CN | 1864937 A | 11/2006 |
| DE | 33 24 615 A1 | 5/1984 |
| EP | 1 714 733 A1 | 10/2006 |

(Continued)

OTHER PUBLICATIONS

International Preliminary Report on Patentability issued in Application No. PCT/JP2009/068002; Dated Jul. 5, 2011 (With Translation).
(Continued)

*Primary Examiner* — Thanh Truong
*Assistant Examiner* — Tara M Ho
(74) *Attorney, Agent, or Firm* — Oliff PLC

(57) ABSTRACT

A power tool performs a predetermined operation by using a tool bit and has a grip part and a dust suction device. The dust suction device has a dust suction part that extends in an axial direction of the tool bit and sucks and collects dust generated during operation at a tip of the tool bit. The dust suction part can be moved between a first position in which the dust suction part covers a bit tip of the tool bit and a second position in which the bit tip is exposed. The dust suction device further has an operation mode switching mechanism that is capable of switching between a first operation mode in which the dust suction part is allowed to move between the first and second positions and a second operation mode in which the dust suction part is locked in the second position.

17 Claims, 22 Drawing Sheets

(51) Int. Cl.
   *B25F 5/02*     (2006.01)
   *B25F 5/00*     (2006.01)

(56) References Cited

U.S. PATENT DOCUMENTS

2006/0272123 A1* 12/2006 Di Nicolantonio et al. . 15/415.1
2008/0245542 A1* 10/2008 Furusawa et al. ............. 173/201

FOREIGN PATENT DOCUMENTS

| FR | 2 279 526 | A1 | 2/1976 |
|----|-----------|----|--------|
| GB | 1 463 796 |    | 2/1977 |
| JP | A-64-087304 | | 3/1989 |
| JP | A-2008-272908 | | 11/2008 |
| JP | A-2008-272909 | | 11/2008 |

OTHER PUBLICATIONS

Supplementary European Search Report issued in Application No. 09833282.8; Dated May 14, 2013.

Chinese Office Action issued in Application No. 200980151118.1; Dated May 14, 2013.

International Search Report issued in Application No. PCT/JP2009/068002; Dated Jan. 19, 2010 (With Translation).

* cited by examiner

POWER TOOL

FIELD OF THE INVENTION

The invention relates to a dust collecting technique for collecting dust generated when a power tool performs a predetermined operation.

BACKGROUND OF THE INVENTION

In a power tool which performs an operation such as a hammering operation or a hammer drill operation by a tool bit on a workpiece such as concrete, dust is generated during operation. Therefore, known power tools are provided with a dust suction device for sucking dust generated during operation. For example, Japanese laid-open patent publication No. 64-87304 discloses a dust suction device in which a dust suction part for sucking dust is provided on a front end of a pipe which extends in parallel to a tool bit. This dust suction device is provided to suck dust generated during operation by the dust suction part and collect the dust via the pipe and a dust transfer passage formed in the power tool body, by performing the operation with the tool bit and the dust suction part held in contact with the workpiece.

When, for example, a drilling operation is performed on a predetermined position of the workpiece, it is necessary to position the tip of a tool bit on the predetermined drilling position. Further, in order to efficiently suck dust, the tip of the tool bit has to be covered by the dust suction part. In such a construction, however, it is difficult for the user to visually check the position of the tip of the tool bit. Therefore, when the user performs an operation which requires positioning of the bit tip on a point of a workpiece to be worked, a cumbersome operation is required, for example, for checking the position of the bit tip. Specifically, while holding the power tool with one hand, the user has to move the dust suction part toward the tool body with the other hand so as to expose the bit tip to the outside in order to check the position of the bit tip. Further, in a large power tool which has to be held by user's both hands, the operation itself of exposing the bit tip to the outside is difficult to perform, Thus, the conventional power tool with the dust suction device is not easy to operate, and in this point, further improvement is desired.

Prior Art: Japanese laid-open patent publication No. 64-87304

DISCLOSURE OF THE INVENTION

Accordingly, it is an object of the invention to provide a technique that contributes to improvement of usability, in a power tool having a dust suction device for sucking dust generated during operation.

In order to solve the above-described problem, according to a preferred embodiment of this invention, a power tool is provided which performs a predetermined operation by using a tool bit. The "power tool" in this invention typically represents an impact tool such as an electric hammer or hammer drill, which performs a hammering operation or hammer drill operation by a tool bit on a workpiece such as concrete, but it is not limited to the impact tool. It also suitably includes other power tools which generate dust during operation.

The power tool according to this invention has at least one grip part and a dust suction device. The dust suction device has a dust suction part that sucks and collects dust generated during operation at a tip of the tool bit. The dust suction part can be moved between a first position in which the dust suction part covers at least a bit tip of the tool bit and a second position in which the bit tip is exposed to the outside, and is biased so as to be normally placed in the first position. Further, the power tool according to this invention further has an operation mode switching mechanism that is capable of switching between a first operation mode in which the dust suction part placed in the first position is allowed to move between the first and second positions and a second operation mode in which the dust suction part is locked in the second position. The operation mode switching mechanism is provided in a region of the grip part or its vicinity such that it can be operated with a user's hand holding the grip part. Further, the "grip part" in this invention naturally represents the handgrip (handle) which is connected to the rear of the power tool body (on the side opposite to the tool bit), but it also suitably includes, for example, a barrel which is integrally formed with the power tool body itself on the front end of the power tool body in the longitudinal direction and a side grip (side handle) which is detachably mounted to the front end of the power tool body in the longitudinal direction. Further, the manner of "allowing the dust suction part to move" in this invention refers to the manner in which, for example, when the dust suction part is pressed against a workpiece or when the pressing operation against the workpiece is released, the dust suction part is allowed to freely move between the first and second positions.

According to this invention, when the operation mode switching mechanism is switched to the first operation mode, the dust suction part placed in the first position is allowed to move between the first and second positions. Further, when the operation mode switching mechanism is switched to the second operation mode, the dust suction part is locked in the second position such that the bit tip is exposed. Therefore, when the user performs, for example, a drilling operation on a workpiece, first in the second operation mode, the user checks the position of the bit tip and positions the bit tip on a point of the workpiece to be drilled. Thereafter, in the first operation mode, the user performs a drilling operation with the dust suction part pressed against the workpiece, so that dust generated by the operation can be efficiently sucked and collected. According to this invention, the user can operate the operation mode switching mechanism while holding the grip part of the power tool. Therefore, usability of the power tool in performing an operation such as a drilling operation on a workpiece can be enhanced. Such a construction is particularly effective in a large power tool which is held with both hands to perform an operation.

According to a further embodiment of the power tool in this invention, the operation mode switching mechanism is formed by an operation mechanism having an operating part and a linkage for linking the operating part to the dust suction part. The operating part can be moved between a first operation position in which the dust suction part is allowed to move between the first and second positions and a second operation position in which the dust suction part is moved from the first position to the second position and locked in the second position. The first operation mode is selected when the operating part is placed in the first operation position, while the second operation mode is selected when the operating part is placed in the second operation position.

According to this invention, positioning of the bit tip on the workpiece can be made by placing the operating part of the operation mechanism in the second operation position, and dust generated during drilling the workpiece after positioning can be efficiently sucked by placing the operating part in the second operation position. At this time, with the construction in which the operating part is disposed in the grip part or its vicinity, the user can easily operate the operating part with the hand holding the grip part.

According to a further embodiment of the power tool in this invention, the mode switching mechanism is formed by a dust suction part locking mechanism having a locking member which locks the dust suction part moved from the first position to the second position in the second position and a lock releasing member which releases the lock of the locking member. The second operation mode is selected when the locking member locks the dust suction part moved from the first position to the second position in the second position, and the first operation mode is selected when the lock releasing member of the lock releasing mechanism is operated to release the lock.

According to this invention, in the drilling operation, for example, when the user holds the dust suction part and moves it from the first position to the second position in order to expose the bit tip to the outside, the dust suction part moved to the second position is locked in the second position by the locking member. Therefore, positioning of the bit tip on a point of the workpiece to be drilled can be easily made. When the user releases the locking member by operating the lock releasing member after positioning of the bit tip, the dust suction part biased toward the first position is returned to the first position and the bit tip is covered by the dust suction part. Therefore, when the user performs the drilling operation while pressing the front end of the dust suction part against the workpiece, dust generated by operation can be efficiently sucked. At this time, with the construction in which the lock releasing member is disposed on the grip part or its vicinity, the user can easily operate the lock releasing member by the hand holding the grip part. In this manner, according to this invention, the dust suction part can be locked, at least in the second position in which the bit tip is exposed to the outside and the lock releasing member can be operated by the user's hand holding the grip part, so that usability of the power tool in the drilling operation can be enhanced.

According to a further embodiment of the power tool in this invention, the power tool has a power tool body. The grip part is formed by a side handle attached to the power tool body transversely to the axial direction of the tool bit, and the operation mode switching mechanism is disposed in a region of the side handle or its vicinity such that it can be operated with a user's hand holding the side handle. According to this invention, the user can operate the operation mode switching mechanism with the hand holding the side handle.

According to a further embodiment of the power tool in this invention, the power tool has a power tool body. The grip part is formed by a main handle attached to the power tool body on the side opposite to the tool bit and the operation mode switching mechanism is disposed in a region of the main handle or its vicinity such that the operation mode switching mechanism can be operated with a user's hand holding the main handle. According to this invention, the user can operate the operation mode switching mechanism with the hand holding the main handle.

According to a further embodiment of the power tool in this invention, the power tool has a power tool body. The grip part is formed by a cylindrical barrel integrally formed on a front end of the power tool body, and the operation mode switching mechanism is disposed in a region of the barrel or its vicinity such that the operation mode switching mechanism can be operated with a user's hand holding the barrel. According to this invention, the user can operate the operation mode switching mechanism with the hand holding the barrel.

According to a further embodiment of the power tool in this invention, the dust suction part and the operation mode switching mechanism are assembled together into the dust suction assembly. Further, the dust suction assembly can be detachably mounted to a region of the grip part or its vicinity such that the dust suction assembly can be operated with a user's hand holding the grip part. According to this invention, with the construction in which the dust suction part and the operation mode switching mechanism form the dust suction assembly, they can be handled as one part, so that ease of mounting them to the power tool can be improved. Further, the dust suction assembly is detachably mounted to the power tool, so that the dust suction assembly can be mounted to the power tool only in use particularly for an operation which requires suction of dust.

According to a further embodiment of the power tool in this invention, the dust suction part has a suction part which sucks dust while covering the bit tip of the tool bit and a hollow dust transfer part which is connected to the suction part and extends parallel to the tool bit at a distance from the tool bit. With such a construction, a means for moving the suction part from the first position to the second position can be easily provided, for example, by provision of the dust transfer part which can extend and contract. Further, the bit tip is covered by the suction part, so that the user can easily check the position of the tool bit by visually checking areas of the tool bit other than the bit tip. Dust sucked through the suction part is transferred via the hollow dust transfer part. In other words, the mounting part (chuck) for mounting the tool bit to the tool body is not used as a passage of dust, so that the mounting part can be protected from adverse effect of dust.

According to a further embodiment of the power tool in this invention, in the construction in which the operation mode switching mechanism is formed by the operation mechanism, the linkage is formed by a wire rope. In this case, the operating part controls the position of the dust suction part via the wire rope. According to this invention, the wire rope is used as a means for transmitting the movement of the operating part to the dust suction part, so that the dust suction part can be smoothly moved and higher freedom is obtained in selecting a location to install the operating part.

According to a further embodiment of the power tool in this invention, in the construction in which the operation mode switching mechanism is formed by the operation mechanism, the power tool has a power tool body, and the dust suction part has a suction part which covers the tool bit and a fixed part which is mounted to the power tool body. The suction part is mounted to the fixed part via a sliding part such that it can slide in the axial direction of the tool bit. According to this invention, with the construction in which the suction part is mounted to the fixed part via a sliding part, the suction part can be smoothly moved with respect to the fixed part.

According to a further embodiment of the power tool in this invention, in the construction in which the operation mode switching mechanism is formed by the operation mechanism and the suction part can slide with respect to the fixed part via the sliding part, the suction part is formed by a bellows-like tubular member which has a predetermined length in the longitudinal direction and can extend and contract in the axial direction of the tool bit. Further, the suction part slides with respect to the fixed part via the sliding part while maintaining the predetermined length in the longitudinal direction. The manner in which the suction part "slides with respect to the fixed part while maintaining the length" refers to the manner in which the tubular member moves without extending and contracting.

According to a further embodiment of the power tool in this invention, in the construction in which the operation mode switching mechanism is formed by the operation mechanism and the suction part can slide with respect to the fixed part via the sliding part, the sliding part has a main guide part and at least one auxiliary guide part. The main guide part is formed by a combination of a movable cylindrical element which is provided on one end of the suction part in the longitudinal direction and a fixed part side cylindrical part which is formed on the fixed part and onto which the movable cylindrical element is slidably fitted. The auxiliary guide part is formed by a combination of a guide rail extending in the axial direction of the tool bit and a slider which can slide with respect to the guide rail. Further, the auxiliary guide part is disposed in parallel to the main guide part and the wire rope is connected to the auxiliary guide part.

For example, in a construction in which the sliding part is formed only by the main guide part having the movable cylindrical element and the fixed side cylindrical part which are fitted one onto another, in order to realize a stable sliding movement when an external force is exerted in the longitudinal direction (the direction of the sliding movement) on any point of an axial end surface of the movable cylindrical element in the circumferential direction, the main guide part has to be provided with a relatively long sliding surface in the longitudinal direction. According to this invention, however, by provision of the construction in which the sliding part has not only the main guide part but also the auxiliary guide part disposed in parallel to the main guide part, the sliding part can realize a stable sliding movement and can be reduced in the length in the longitudinal direction. Thus, this construction is effective in size reduction in the direction of the sliding movement of the sliding part.

According to a further embodiment of the power tool in this invention, in the construction in which the suction part can slide with respect to the fixed part via the sliding part and the sliding part has the main guide part consisting of the movable cylindrical element and the fixed side cylindrical part which are fitted one onto another, the suction part and the movable cylindrical element are formed as separate members. A wire stopper having a larger diameter than the wire rope is provided on an end of the wire rope, and the movable cylindrical element has a large-diameter hole through which the wire stopper is allowed to pass and a small-diameter hole through which the wire stopper is not allowed to pass. The wire stopper passed through the large-diameter hole is led into the small-diameter hole and then prevented from slipping out of the movable cylindrical element. Further, when the suction part is mounted onto the movable cylindrical element, the suction part faces the large-diameter hole, so that the wire stopper is prevented from moving from the small-diameter hole to the large-diameter hole. According to this invention, the end of the wire rope can be rationally connected to the suction part without using a fastening means such as a screw.

According to a further embodiment of the power tool in this invention, the power tool has a motor for driving the tool bit. A motor operating member for starting and stopping the motor is provided on the grip part, and the motor operating member is disposed adjacent to the lock releasing member. According to this invention, with the construction in which the motor operating member and the lock releasing member are disposed adjacent to each other, the user can operate both the motor operating member and the lock releasing member with the hand holding the grip part. Specifically, one-hand operation can be realized, so that usability can be further enhanced.

According to a further embodiment of the power tool in this invention, the power tool has a power tool body. The dust suction part includes a suction part formed by a tubular member which entirely covers the tool bit and can extend and contract in the axial direction of the tool bit, a fixed part that is mounted to the front end region of the power tool body and to which the suction part is connected, and a guide part that guides the extending and contracting movement of the suction part. The suction part moves between the first and second positions by extending and contracting while being guided by the guide part. Further, the "tubular member which can extend and contract" in this invention typically represents a bellows-like tubular member capable of extending and contracting, but it also suitably includes a telescopic tubular member which is telescopically formed by a plurality of tubular elements which can be slidably fitted one onto another. According to this invention, the tool bit can be exposed through the tubular member by contracting the extendable tubular member.

According to a further embodiment of the power tool in this invention, the dust suction part has a suction part which covers only the bit tip of the tool bit and moves between the first and second positions, and a guide part which extends in parallel to the tool bit at a distance from the tool bit and guides the movement of the suction part. Further, the manner of "guiding the movement of the suction part" in this invention suitably includes, for example, the manner in which the suction part slides in contact with a fixedly extending linear rod-like member, or the manner in which the suction part moves by the extending and contracting movement of the guide part itself. According to this invention, with the construction in which the suction part covers only the bit tip, during an operation which does not require an accurate positioning of the bit tip, the position of the tool bit can be easily checked by visually checking areas of the tool bit other than the bit tip.

According to a further embodiment of the power tool in this invention, a dust transfer passage for transferring dust sucked into the suction part downstream is formed within the guide part. According to this invention, the guide part is provided with not only the function of guiding the movement of the suction part but also the function of transferring dust, so that the number of parts can be reduced.

According to a further embodiment of the power tool in this invention, the dust suction part is provided with an illuminating means for lighting the bit tip of the tool bit which is exposed through the front end of the dust suction part. According to this invention, by provision of the illuminating means, the position of the bit tip can be more easily checked, which leads to enhancement of operability. Further, as the "illuminating means" in this invention, the illuminating means such as an LED (light-emitting diode) light, an incandescent bulb and a fluorescent bulb can be suitably used.

According to a further embodiment of the power tool in this invention, the illuminating means is turned off when the dust suction part is placed in the first position and turned on when the dust suction part is placed in the second position. According to this invention, with the construction in which the illuminating means is turned on only when necessary, a waste of electric energy can be reduced.

According to the invention, a technique is provided which contributes to enhancement of usability, in a power tool having a dust suction device for sucking dust generated during operation.

EMBODIMENT OF THE INVENTION (First Embodiment of the Invention)

A first embodiment of the invention is now described with reference to FIGS. 1 to 6. In this embodiment, an electric hammer drill is explained as a representative example of a power tool.

Figure 1:
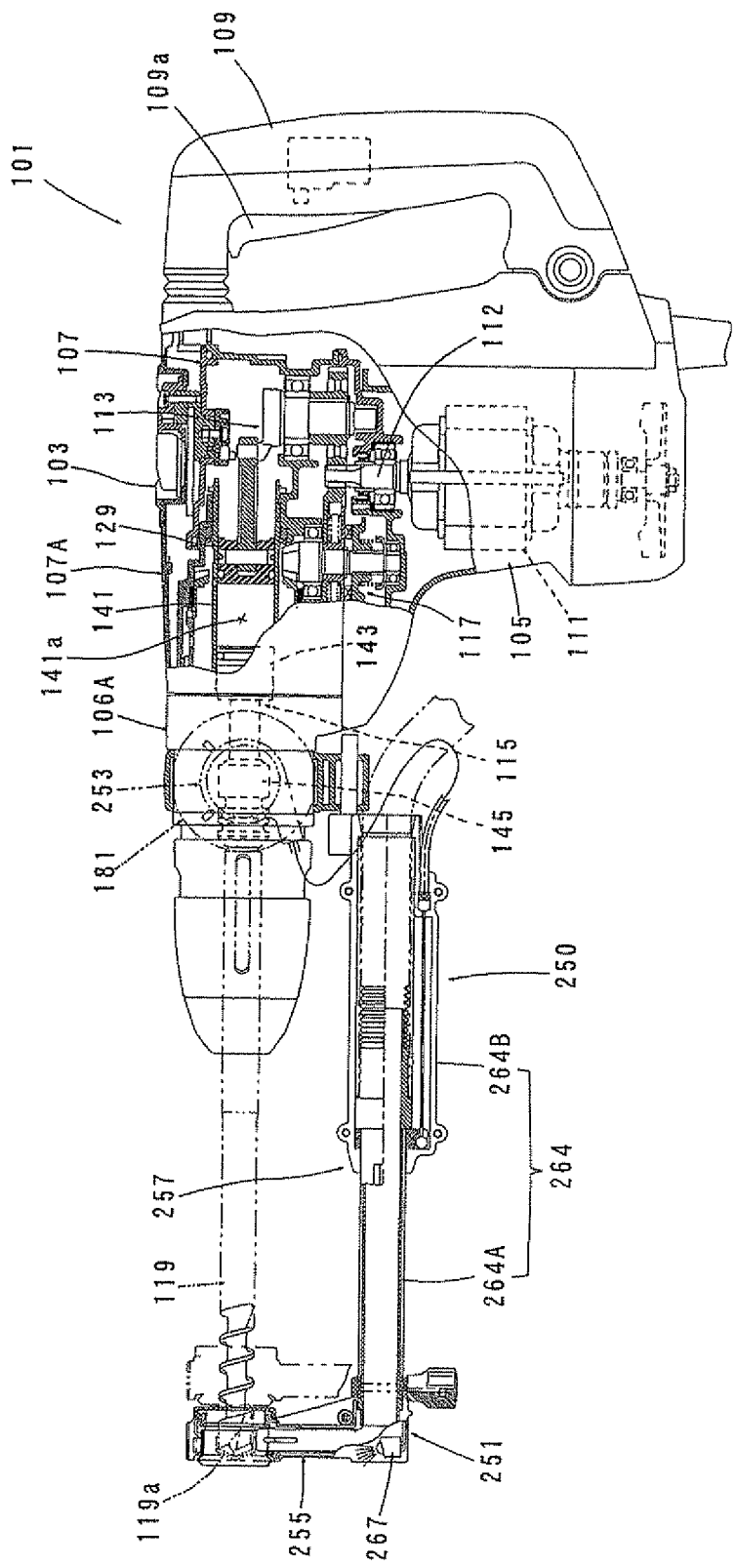
FIG. 1 is a side view, partially in section, showing an entire structure of a hammer drill with a dust suction device according to a first embodiment of the invention.

As shown in FIG. 1, a hammer drill 101 of this embodiment mainly includes a body 103 that forms an outer shell of the hammer drill 101, a hammer bit 119 detachably coupled to a front (left as viewed in FIG. 1) end region of the body 103 via a tool holder (not shown), and a handgrip 109 that is designed to be held by a user and connected to a side of the body 103 opposite from the hammer bit 119. The body 103, the hammer bit 119 and the handgrip 109 are features that correspond to the "tool body", the "tool bit" and the "main handle", respectively, in this invention. The hammer bit 119 is held by the tool holder such that it is allowed to reciprocate with respect to the tool holder in its axial direction and prevented from rotating with respect to the tool holder in its circumferential direction. For the sake of convenience of explanation, in a horizontal position of the body 103 in which the axial direction of the hammer bit 119 coincides with a horizontal direction, the hammer bit 119 side is taken as the front, and the handgrip 109 side as the rear.

The body 103 mainly includes a motor housing 105 that houses a driving motor 111, a gear housing 107 that houses a motion converting mechanism 113 and a power transmitting mechanism 117 which are designed as a driving mechanism, and a generally cylindrical barrel (not shown) that houses a striking mechanism 115. Further, in the horizontal position of the body 103 in which the axial direction of the hammer bit 119 coincides with the horizontal direction, the gear housing 107 is covered from the outside by a gear housing cover 107A and an upper region of a motor housing 105, and the barrel is covered from the outside by a barrel cover 106A. The gear housing cover 107A and the barrel cover 106A are provided as components of the body 103.

The motion converting mechanism 113 converts a rotating output of the driving motor 111 into liner motion and then transmits it to the striking mechanism 115, so that an impact force is generated in the axial direction of the hammer bit 119 (the horizontal direction as viewed in FIG. 1) via the striking mechanism 115. Further, the power transmitting mechanism 117 appropriately reduces the speed of the rotating output of the driving motor 111 and transmits it to the hammer bit 119, so that the hammer bit 119 is caused to rotate in the circumferential direction. The driving motor 111 is disposed below the axis of the hammer bit 119 such that an extension of an axis of an output shaft 112 crosses the axis of the hammer bit 119. Further, the driving motor 111 is driven when a user depresses a trigger 109a disposed on the handgrip 109.

The motion converting mechanism 113 mainly includes a crank mechanism. When the crank mechanism is rotationally driven by the driving motor 111, a driving element in the form of a piston 129 which forms a final movable member of the crank mechanism linearly moves in the axial direction of the hammer bit within a cylinder 141. Further, the power transmitting mechanism 117 mainly includes a gear speed reducing mechanism having a plurality of gears and transmits torque of the driving motor 111 to the tool holder. Thus, when the tool holder is caused to rotate in a vertical plane, the hammer bit 119 held by the tool holder is also caused to rotate. The constructions of the motion converting mechanism 113 and the power transmitting mechanism 117 are well known in the art and therefore they are not described in further detail.

The striking mechanism 115 mainly includes a striking element in the form of a striker 143 that is slidably disposed within the bore of the cylinder 141 together with the piston 129, and an intermediate element in the form of an impact bolt 145 that is slidably disposed within the tool holder. When the striker 143 is driven via an air spring action (pressure fluctuations) of an air chamber 141a of the cylinder 141 by sliding movement of the piston 129, the striker 143 collides with (strikes) the impact bolt 145 and transmits the striking force to the hammer bit 119 via the impact bolt 145.

The hammer drill 101 can be switched between a hammer mode and a hammer drill mode by user's appropriate operation. In the hammer mode, the hammer bit 119 is caused to perform an operation on a workpiece by applying only a striking force to the hammer bit 119 in the axial direction, and in the hammer drill mode, the hammer bit 119 is caused to perform an operation on a workpiece by applying a striking force in the axial direction and a rotating force in the circumferential direction. However, hammer drive for applying a striking force to the hammer bit 119 in the axial direction and hammer drill drive for applying a striking force in the axial direction and a rotating force in the circumferential direction, and mode change between the hammer mode and the hammer drill mode are well known in the art and not directly related to the invention, and therefore they are not described in further details.

In the hammer drill 101 constructed as described above, when the driving motor 111 is driven, its rotating output is converted into linear motion via the motion converting mechanism 113 and then causes the hammer bit 119 to perform linear motion in the axial direction or hammering movement via the striking mechanism 115. Further, in addition to the above-described hammering movement, the hammer bit 119 is caused to perform drilling movement in the circumferential direction when rotation is transmitted to the hammer bit 119 via the power transmitting mechanism 117 driven by the rotating output of the driving motor 111. Specifically, when the hammer drill 101 is driven in hammer drill mode, the hammer bit 119 is caused to perform hammering movement in the axial direction and drilling movement in the circumferential direction, so that a hammer drill (drilling) operation is performed on a workpiece. On the other hand, when the hammer drill 101 is driven in hammer mode, transmission of rotating power via the power transmitting mechanism 117 is interrupted by a clutch. Therefore, the hammer bit 119 is caused to perform only the hammering movement in the axial direction, so that a hammering (chipping) operation is performed on the workpiece.

A dust suction device 250 which is attached to the hammer drill 101 having the above-described construction and serves to suck dust generated during operation on a workpiece (such as concrete) is now explained with reference to FIGS. 2 to 6.

The dust suction device 250 according to this embodiment mainly includes a dust suction unit 251 that covers a tip of the hammer bit 119 and sucks and collects dust generated during operation, and an operation mechanism part 253 that is operated to retract a front end portion of the dust suction unit 251 toward the body 103 in order to expose a tip 119a (hereinafter referred to as a bit tip) of the hammer bit 119 from the dust suction unit 251 before operation. The dust suction device 251 is a feature that corresponds to the "dust suction part" in this invention and the operation mechanism part 253 is a feature that corresponds to the "operation mechanism" and the "operation mode switching mechanism" in this invention.

Figure 2:
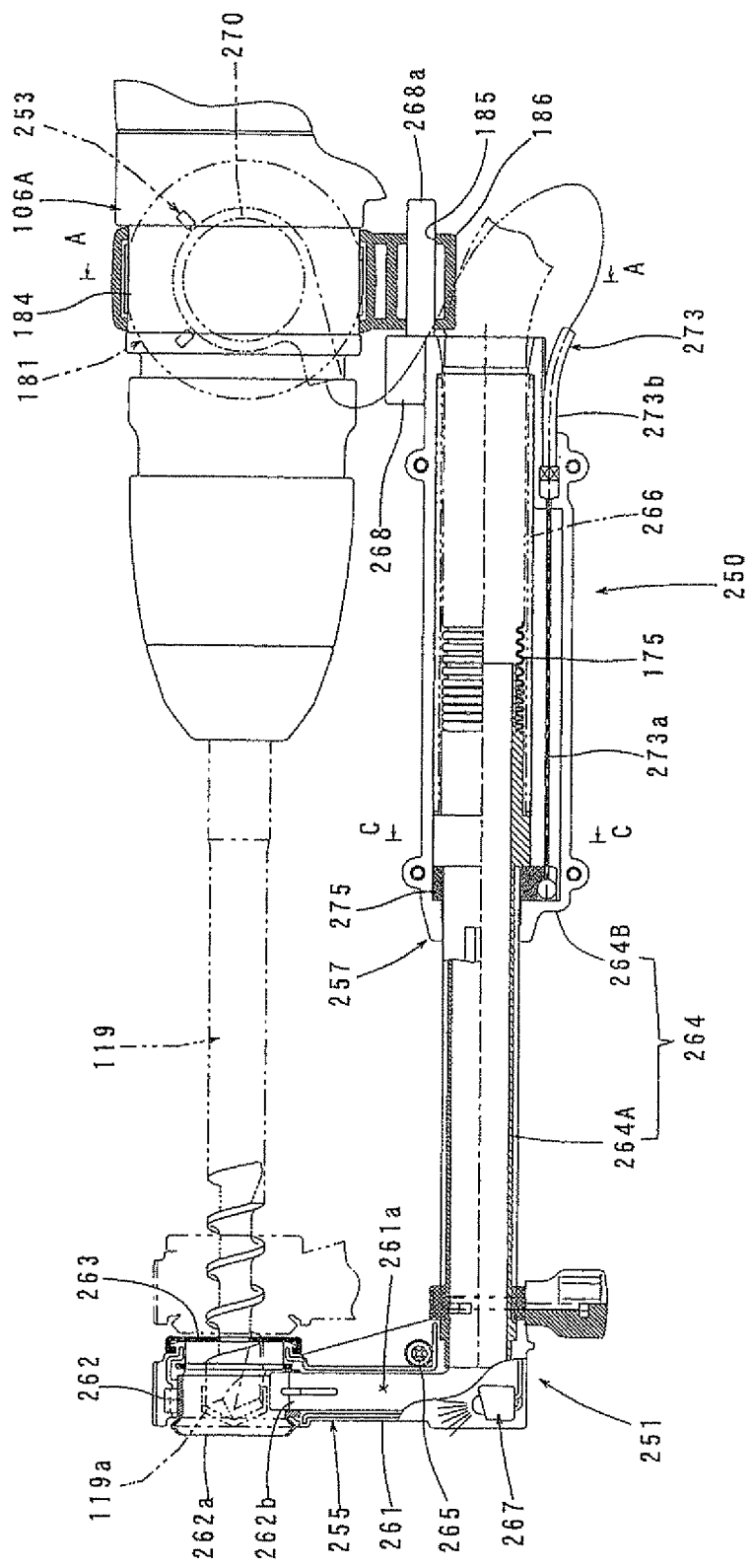
FIG. 2 is a sectional view showing an entire structure of the dust suction device.

As shown in FIG. 2, the dust suction unit 251 according to the invention has a suction part 255 which has a suction port and is pressed against the workpiece together with the hammer bit 119 and sucks dust during operation, and a transfer part 257 which transfers dust sucked by the suction part 255. The suction part 255 and the transfer part 257 are features that correspond to the "suction part" and the "dust transfer part", respectively, in this invention. The suction part 255 has a generally box-like suction part body 261 and a suction sleeve 262 for dust suction which is provided on one end of the suction part body 261 in a direction transverse to the axial direction of the tool bit.

The suction sleeve 262 is provided as a suction member which covers (surrounds) the bit tip 119a of the hammer bit 119 extending through the suction sleeve 262 with a predetermined clearance and sucks dust, A front end (left end as viewed in FIG. 2) of the suction sleeve 262 protrudes forward of a front end surface of the suction part body 261 and is open as a suction port 262a, During operation, the suction sleeve 262 is held in contact with a surface of the workpiece (surface to be worked) and sucks in dust. Further, a flexible material, for example, in the form of a rubber cover 263 is provided on a rear surface of the suction part body 261 (on a side opposite to the suction port 262a of the suction sleeve 262) and the hammer bit 119 extends through the rubber cover 263. The rubber cover 263 allows the hammer bit 119 to move in its axial direction with respect to the suction sleeve 262 while preventing dust sucked into the suction sleeve 262 from escaping out of the suction part body 261 by utilizing elastic deformation of the rubber cover 263. Dust sucked into the suction sleeve 262 is transferred to an internal space 261a of the suction part body 261 through a communication hole 262b formed in a side wall of the suction sleeve 262.

The transfer part 257 is connected to the other end of the suction part body 261 in the direction transverse to the axial direction of the tool bit. When an operation such as a drilling operation is performed on the workpiece by the hammer bit 119 with the suction part 255 pressed against the workpiece together with the hammer bit, the suction part 255 pressed against the workpiece must retract toward the body 103 with respect to the hammer bit 119 as the operation proceeds (the hammer bit 119 digs into the workpiece).

Figure 3:
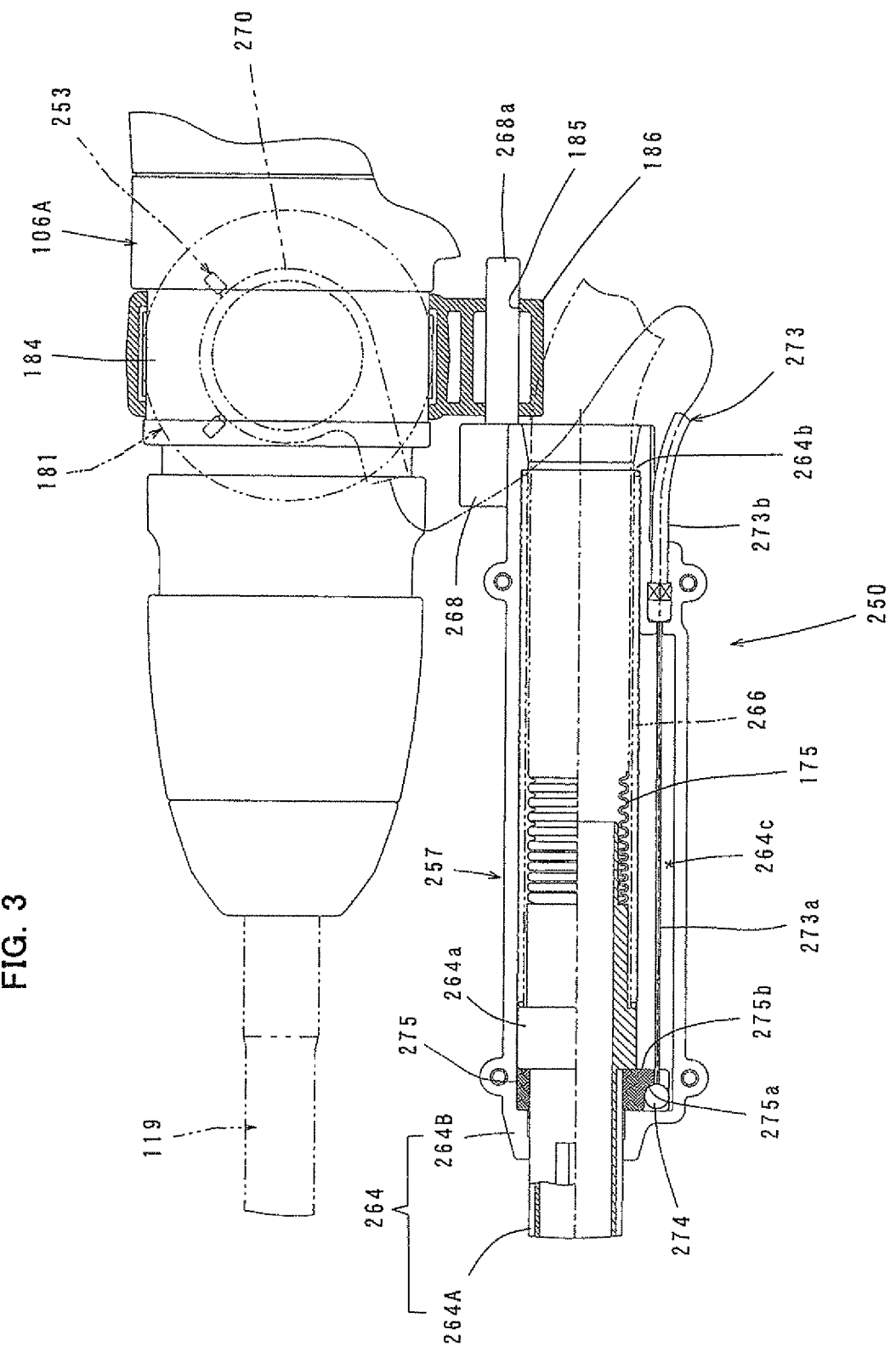
FIG. 3 is a partially enlarged view showing part of FIG. 2.

In order to allow the suction part 255 to retract, the transfer part 257 mainly includes a telescopic dust transfer tubular member 264 that extends parallel to the hammer bit 119. FIG. 3 shows the dust transfer tubular member 264 in detail. As shown in FIG. 3, the telescopic dust transfer tubular member 264 includes an inner tube 264A and an outer tube 264B which are fitted such that they can slide in the longitudinal direction with respect to each other. A front end of the inner tube 264A is fitted in a mounting hole of the suction part body 261, and in this state, the dust transfer tubular member 264 is detachably fastened to the suction part body 261 by a fixing screw 265. Therefore, the suction part 255 which mainly includes the suction part body 261 and the suction sleeve 262 can be removed for replacement from the dust transfer tubular member 264.

A dust collecting hose 175 including a bellows region which can extend and contract is inserted into the bore of the outer tube 264B and its front end is connected to the rear end of the inner tube 264A. With such a construction in which the dust collecting hose 175 is connected to the rear end of the inner tube 264A within the bore of the outer tube 264B, dust can be prevented from being caught in a sliding surface between the inner tube 264A and the outer tube 264B. Further, the dust collecting hose 175 extends to the outside of the outer tube 264B and is connected at its rear end to a dust collector which is not shown. Therefore, when the dust collector is driven, dust is sucked into the suction sleeve 262 and transferred to a dust collector via the internal space 261a of the suction part body 261, the bore of the inner tube 264A and the dust collecting hose 175 and collected in the dust collector.

A biasing member in the form of a compression coil spring 266 for biasing the inner tube 264A forward is installed outside of the dust collecting hose 175 within the bore of the outer tube 264B. The inner tube 264A is moved forward by the compression coil spring 266, so that the dust transfer tubular member 264 is held in the extended state. Further, one end of the compression coil spring 266 is received by an outer flange 264a formed on an outer surface of the inner tube 264A and the other end is received by an inner flange 264b formed on an inner surface of the outer tube 264B.

Further, a lighting unit 267 is provided on the other end of the suction part body 261 (in the vicinity of its connection with the inner tube 264A) and serves to light a bit tip 119a. The lighting unit 267 mainly includes a light source in the form of an LED (light-emitting diode) light and a light case that is made of translucent materials (such as transparent resin and glass) and houses the LED light. The lighting unit 267 is a feature that corresponds to the "lighting means" in the invention. When the suction part 255 is retracted toward the body 103 of the hammer drill 101 by operating an operation mechanism part 253 which is described below, the bit tip 119*a* protrudes through the suction port 262*a* of the suction sleeve 262 and is exposed to the outside (as shown by two-dot chain line in FIGS. 1 and 2). At this time, the lighting unit 267 lights the bit tip 119*a*. A light irradiation direction of the lighting unit 267 is predetermined such that the lighting unit 267 lights the bit tip 119*a*.

Although not shown, the lighting unit 267 is normally held in the off state, and it is turned on when an operating lever 271 of the operation mechanism part 253 which will be described below is operated to expose the bit tip 119*a*. Such an on-off operation of the lighting unit 267 can be realized, for example, by provision of a construction in which a switch for the light unit is turned on and off in synchronization with operation of the operating lever 271.

Figure 4:
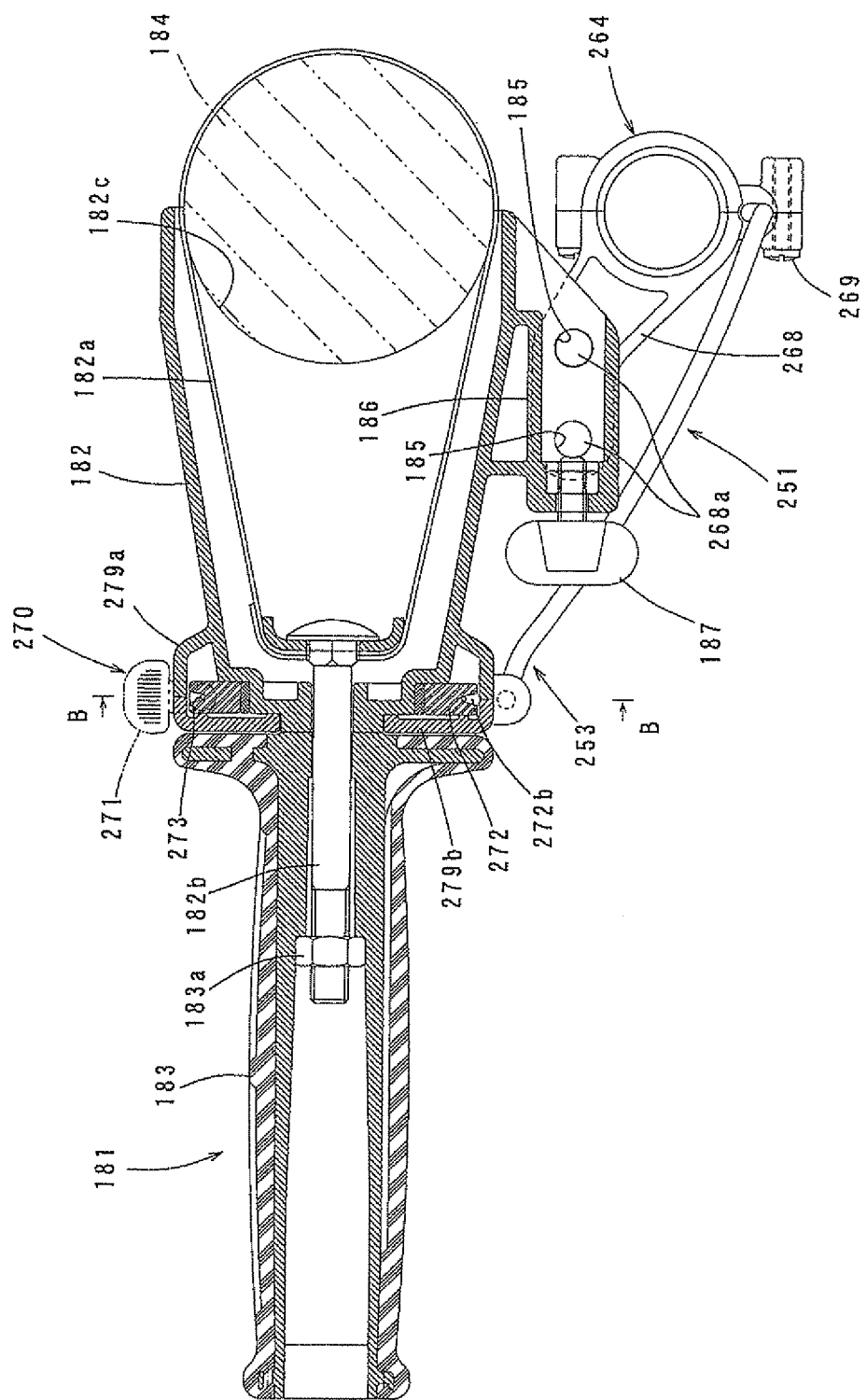
FIG. 4 is a sectional view taken along line A-A in FIG. 2.

Mounting of the dust suction unit 251 constructed as described above to the hammer drill 101 is now explained. The dust suction unit 251 according to this embodiment is mounted to a side grip 181. The side grip 181 is a feature that corresponds to the "grip part" in this invention. The side grip 181 is mounted to the barrel cover 106A. For this purpose, a grip mounting part 184 is formed on the barrel cover 106A by its circumferential surface having a predetermined width in parallel to the longitudinal direction of the body 103. As shown in FIG. 4, the side grip 181 is a rod-like member extending horizontally in a direction (a lateral direction) transverse to the axial direction of the hammer bit 119 and mainly includes a grip body 182 detachably mounted to the barrel cover 106A and a grip part 183 designed to be held by the user. The grip part 183 comprises a hollow cylindrical member of which one end in the longitudinal direction is connected to the grip body 182.

A generally semi-circular engagement surface 182*c* is formed on front and rear side plates of the grip body 182 in the axial direction of the hammer bit. Further, the grip body 182 has a fastening band 182*a* and a threaded control rod 182*b* for controlling the band. One end of the threaded control rod 182*b* is connected to the fastening band 182*a*, and the other end extends within a bore of the grip part 183. Further, a nut 183*a* which turns together with the grip part 183 is threadably engaged with a threaded portion of an extending end of the threaded control rod 182*b*.

In order to mount the side grip 181 to the grip mounting part 184, firstly, the body 103 is inserted from its front end (on the hammer bit 119 side) into a circular part defined by the engagement surface 182*c* of the grip body 182 and the fastening band 182*a*, and this circular part is positioned on the grip mounting part 184 of the barrel cover 106A. In this state, the nut 183*a* is turned together with the grip part 183, so that the fastening band 182*a* is moved toward the engagement surface 182*c* by the threaded control rod 182*b* and the grip mounting part 184 is held between the fastening band 182*a* and the engagement surface 182*c*. In this manner, the side grip 181 is mounted to the barrel cover 106A (see FIGS. 2 and 4).

As shown in FIGS. 2 to 5, the dust suction unit 251 has a bracket 268 provided on the rear end of the outer tube 264B of the dust transfer tubular member 264, and the bracket 268 has two mounting rods 268*a* extending in the axial direction of the tool bit. The mounting rods 268*a* are inserted into two through holes 185 which are formed through a dust suction unit mounting part 186 provided on the grip body 182 of the side grip 181, and in this state, the mounting rods 268*a* are clamped by a screw 187. In this manner, the dust collecting unit 251 is detachably mounted to the side grip 181.

The hammer drill 101 is most commonly used for a drilling operation on a pre-marked point of a workpiece. For this purpose, prior to the drilling operation, at least the bit tip 119*a* has to be exposed through the front end of the dust suction sleeve 263. Therefore, in this embodiment, the operation mechanism part 253 is provided which is operated to retract the suction part 255 of the dust suction unit 251 toward the body 103 in order to expose the bit tip 119*a* to the outside. The operation mechanism part 253 is explained with reference to FIGS. 2 to 6. The operation mechanism part 253 mainly includes an operating part 270 and a wire rope 273 for transmitting movement of the operating part 270 to the inner tube 264A. The operating part 270 and the wire rope 273 are features that correspond to the "operating part" and the "linkage", respectively, in this invention. The operating part 270 includes an operating lever 271 and a disk-like rotary ring 272 having the operating lever 271.

The grip body 182 of the side grip 181 has a ring housing space formed in a region of connection with the grip part 183, and the rotary ring 272 is disposed within the ring housing space such that it can pivot around the axis of the side grip 181. The operating lever 271 extends radially from an outer circumferential surface of the rotary ring 272 and protrudes to the outside of the ring housing space through a groove which is formed through a wall forming the ring housing space and extends in the circumferential direction of the rotary ring 272. In this manner, the operating lever 271 is provided in the region of connection of the grip body 182 with the grip part 183 such that the user can operate the operating lever 271 with the hand holding the grip part 183. In other words, the operating part 270 is provided in a region such that it can be operated by the user's hand holding the grip part 183.

The ring housing space formed in the grip body 182 is designed as a space surrounded by a generally bowl-shaped ring housing case 189*a* which is integrally formed with the grip body 182, and a generally bowl-shaped case cover 189*b* which is oppositely connected to the ring housing case 189*a*. The perimeter of the case cover 189*b* is fastened to the ring housing case 189*a* by a plurality of screws 189*c*. Therefore, when the grip part 183 of the side grip 181 is removed from the grip body 182 (when the nut 183*a* is removed from the threaded control rod 182*b*, the grip part 183 is separated from the grip body 182) and the case cover 189*b* is removed from the ring housing case 189*a* by removing the screws 189*c*, the rotary ring 272 can be taken out of the ring housing case. Specifically, the operating part 270 of the operation mechanism part 253 is detachably mounted to the side grip 181.

The wire rope 273 includes an inner wire 273*a* and an outer tube 273*b*. The inner wire 273*a* has spherical engagement parts 274 on its both ends. One of the engagement parts 274 is engaged with an engagement recess 272*a* formed in a radially outer portion of the rotary ring 272, and the other engagement part 274 is engaged with an engagement recess 275*a* which is formed in a slide ring 275 within the outer tube 264B of the telescopic dust transfer tubular member 264. The slide ring 275 can slide in the outer tube 264B and is connected to an outer circumferential surface of a rear end of the inner tube 264A. Thus, the inner tube 264A is connected to the rotary ring 272 by the inner wire 273*a* via the slide ring 275.

Figure 5:
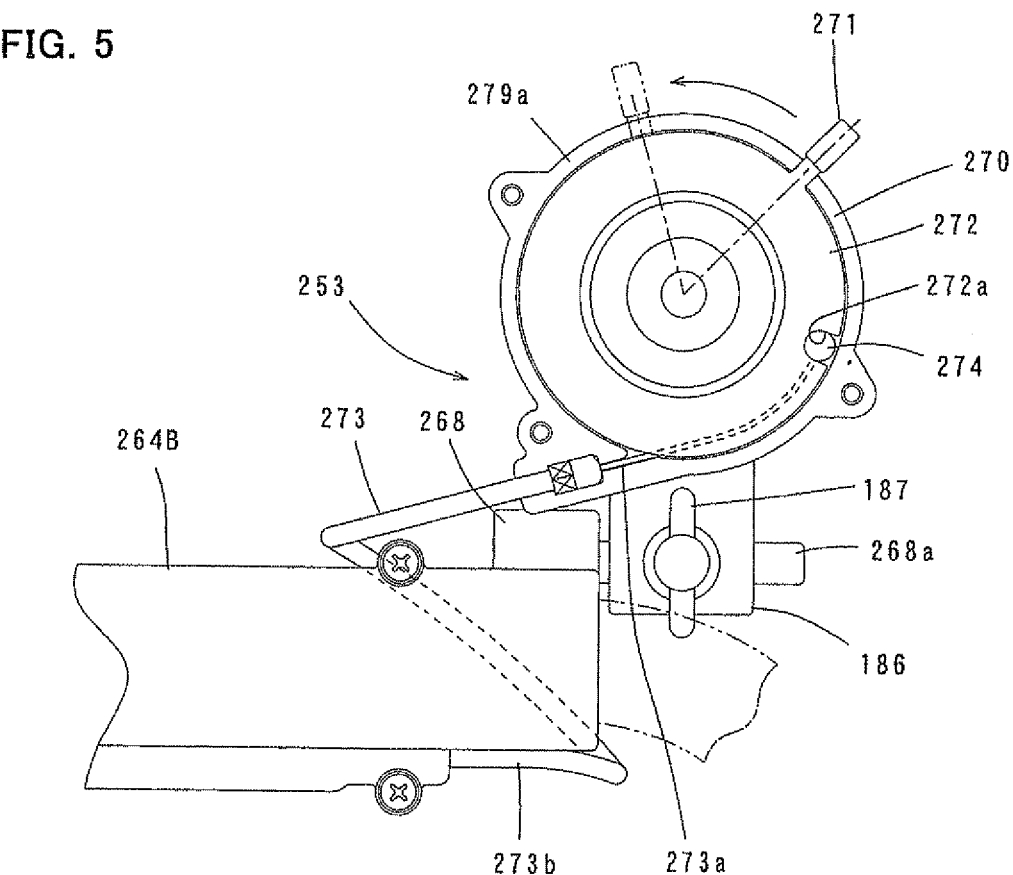
FIG. 5 is a sectional view taken along line B-B in FIG. 4.

When the operating lever 271 of the rotary ring 272 is turned counterclockwise as viewed in FIG. 5, the inner wire 273*a* connected to the rotary ring 272 is pulled rearward, so that the inner tube 264A is moved rearward within the outer tube 264B together with the slide ring 275 via the inner wire 273*a* against spring force of the compression coil spring 266.

Thus, the suction part 255 is retracted to a rear position which is shown by two-dot chain line in FIGS. 1 and 2 and the bit tip 119a is exposed through the suction part 255. This state is a feature that corresponds to the "second operation mode" in this invention. When an external force applied to the operating lever 271 is released, the suction part 255 is moved together with the inner tube 264A to a front position to cover the bit tip 119a by the biasing force of the compression coil spring 266 and the operating lever 271 is returned to its initial position. In this state, the suction part 255 is allowed to arbitrarily move between the front and rear positions. This state is a feature that corresponds to the "first operation mode" in this invention.

By operating the operating lever 271 as described above, the position of the suction part 255 is changed between the front position to cover the bit tip 119a and the rear position to expose the bit tip 119a. The front position and the rear position are features that correspond to the "first position" and the "second position", respectively, in this invention. Further, the position to which the operating lever 271 is turned and the initial position in which the operating lever 271 is initially placed before turning operation are features that correspond to the "second operation position" and the "first operation position", respectively, in this invention.

Figure 6:
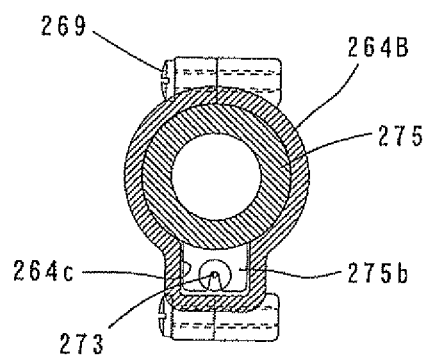
FIG. 6 is a sectional view taken along line C-C in FIG. 2.

A portion of the inner wire 273a on the rotary ring side is guided by a guide groove 272a which is formed in the outer circumferential surface of the rotary ring 272 and extends in the circumferential direction. As shown in FIG. 6, the engagement recess 275a of the slide ring 275 is formed in a protrusion 275b extending radially outward from the slide ring 275 and the protrusion 275b is slidably engaged with a guide groove 264c which is formed in the outer tube 264B and extends in the longitudinal direction. With such a construction, the slide ring 275 and the inner tube 264A are prevented from moving in the circumferential direction with respect to the outer tube 264B. A portion of the inner wire 273a on the slide ring side runs through the guide groove 264c of the outer tube 264B and is terminated at the slide ring 275. Further, one end of the outer tube 273b is fixed to the ring housing part of the grip body 182, and the other end is fixed to a rear end of the outer tube 264B of the telescopic dust transfer tubular member 264.

As described above, a plurality of components forming the operation mechanism part 253 are mounted to a plurality of components forming the dust suction unit 251. Specifically, the components of the dust suction unit 251 and the components of the operation mechanism part 253 are assembled together, so that a dust suction assembly is formed. By thus forming the dust suction assembly of the dust suction unit 251 and the operation mechanism part 253, they can be handled as one part, so that, for example, ease of mounting them to the tool body can be improved.

Further, the dust suction assembly is detachably mounted to the side grip 181, so that the dust suction assembly can be mounted only in use particularly for an operation which requires suction of dust. In order to improve ease of mounting as described above or particularly ease of installing the wire rope 273 to the dust transfer tubular member 264, the outer tube 264B is formed by two halves, and the two halves are connected to each other by connecting bolts 269 after the wire rope 273 is installed.

The dust suction device 250 according to this embodiment has the above-described construction. Therefore, when the user performs, for example, a drilling operation on a workpiece (concrete wall) by using the hammer drill 101 while driving the dust collector, the user holds the hand grip 109 with one hand and turns the operating lever 271 counterclockwise as viewed in Ha 2 while holding the side grip 181 with the other hand. At this time, the dust transfer tubular member 264 is contracted via the inner wire 273a and the suction part 255 is moved rearward, so that the bit tip 119a is exposed through the suction part 255. Thus, the user can visually check the position of the bit tip 119a while maintaining the exposed state and then position the bit tip 119a on a point of the workpiece to be drilled.

When the external force applied to the operating lever 271 is released after this positioning, the suction part 255 is moved forward by biasing force of the compression coil spring 266 and the suction sleeve 262 of the suction part 255 is pressed against the surface of the workpiece. In this state, when the trigger 109a is depressed, the hammer drill 101 is driven to perform a drilling operation by causing the hammer bit 119 to perform hammering movement in its axial direction and drilling movement in its circumferential direction. During this operation, dust generated by the operation is sucked into the internal space 261a of the suction part body 261 through the suction port 262a of the suction sleeve 262. Dust sucked into the internal space 261a is transferred to the dust collector via the inner tube 264A and the dust collecting hose 175 and collected in the dust collector. The dust transfer tubular member 264 is contracted as the hammer bit 119 digs into the workpiece. At this time, the suction part 255 is relatively moved rearward toward the body 103 while being pressed against the workpiece. Therefore, disposal of dust is made without any trouble.

As described above, according to this embodiment, while holding the handgrip 109 and the side grip 181 of the hammer drill 101, the user can operate the operating lever 271 with the hand holding the side grip 181 and stop the bit tip 119a at the position in which the bit tip is exposed through the dust suction part 255, so that the user can visually check the position of the bit tip 119a. Thus, the usability in operation is enhanced.

Further, according to this embodiment, the dust suction unit 251 has the suction part 255 which sucks dust while covering the bit tip 119a, and the telescopic dust transfer tubular member 264 which is connected to the suction part 255 and extends in parallel to the hammer bit 119 at a distance from the hammer bit. Therefore, by extending and contracting the dust transfer tubular member 264, the suction part 255 can be smoothly moved between the front position to cover the bit tip 119a and the rear position to expose the bit tip 119a. Further, the hammer bit 119 is exposed to the outside except for the bit tip 119a, so that the position of the hammer bit 119 can be easily checked.

Dust sucked in the suction part 255 is transferred to the dust collector through the bore of the dust transfer tubular member 264 that extends parallel to the hammer bit 119 at a distance from the hammer bit. Therefore, compared with, for example, a construction in which a space between a suction part and the outer surface of the hammer bit 119 is used as a dust transfer passage while the suction part entirely covers the hammer bit, a mounting part (chuck) for mounting the hammer bit 119 to the body 103 is not used as a passage of dust, so that the mounting part can be protected from adverse effect of dust.

In this embodiment, the wire rope 273 is used as a means for transmitting the movement of the operating lever 271 to the inner tube 264A of the dust transfer tubular member 264, so that higher freedom is obtained in selecting a location to install the operating part 270.

Further, the lighting unit 267 is provided in the suction part 255 and designed to light the bit tip 119a which is exposed through the suction part 255. Therefore, the position of the bit tip 119a can be more easily checked. Furthermore, the lighting unit 267 is turned off when the bit tip 119a is covered by the suction part 255, and is turned on when the bit tip 119a is exposed through the suction part in order to check its position, so that waste of electric energy can be reduced.

Figure 7:
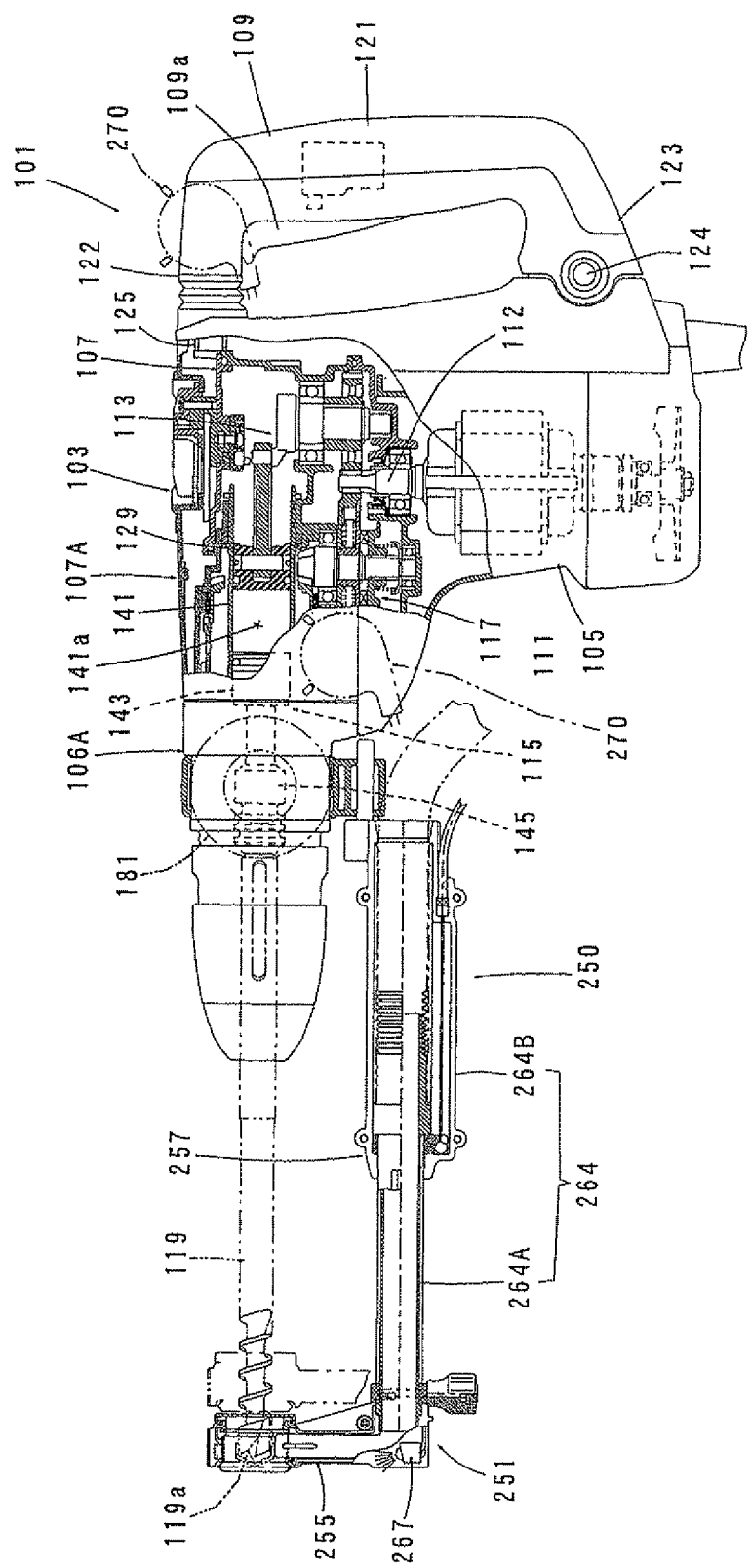
FIG. 7 is a view showing a modification relating to a mounting position for an operating part of the dust suction device.

A modification to this embodiment is now explained. In the modification shown in FIGS. 7 to 9, the operating part 270 (which are formed by the operating lever 271 and the disk-like rotary ring 272) of the dust suction unit 250 which is explained in the above-described embodiment, can be selectively mounted externally to a region of the body 103 in the vicinity of the side grip 181 such that the operating lever 271 can be operated by the user's hand holding the side grip 181, or a region in the vicinity of the handgrip 109 such that the operating lever 27 can be operated by the user's hand holding the handgrip 109 (as shown in FIG. 7 by two-dot chain line). In the other points, it has the same construction as the above-described embodiment. Therefore, components or elements of the hammer drill 101 and the dust suction device 250 shown in FIGS. 7 and 8 are given like numerals as in the above-described embodiment and are not described.

Figure 8:
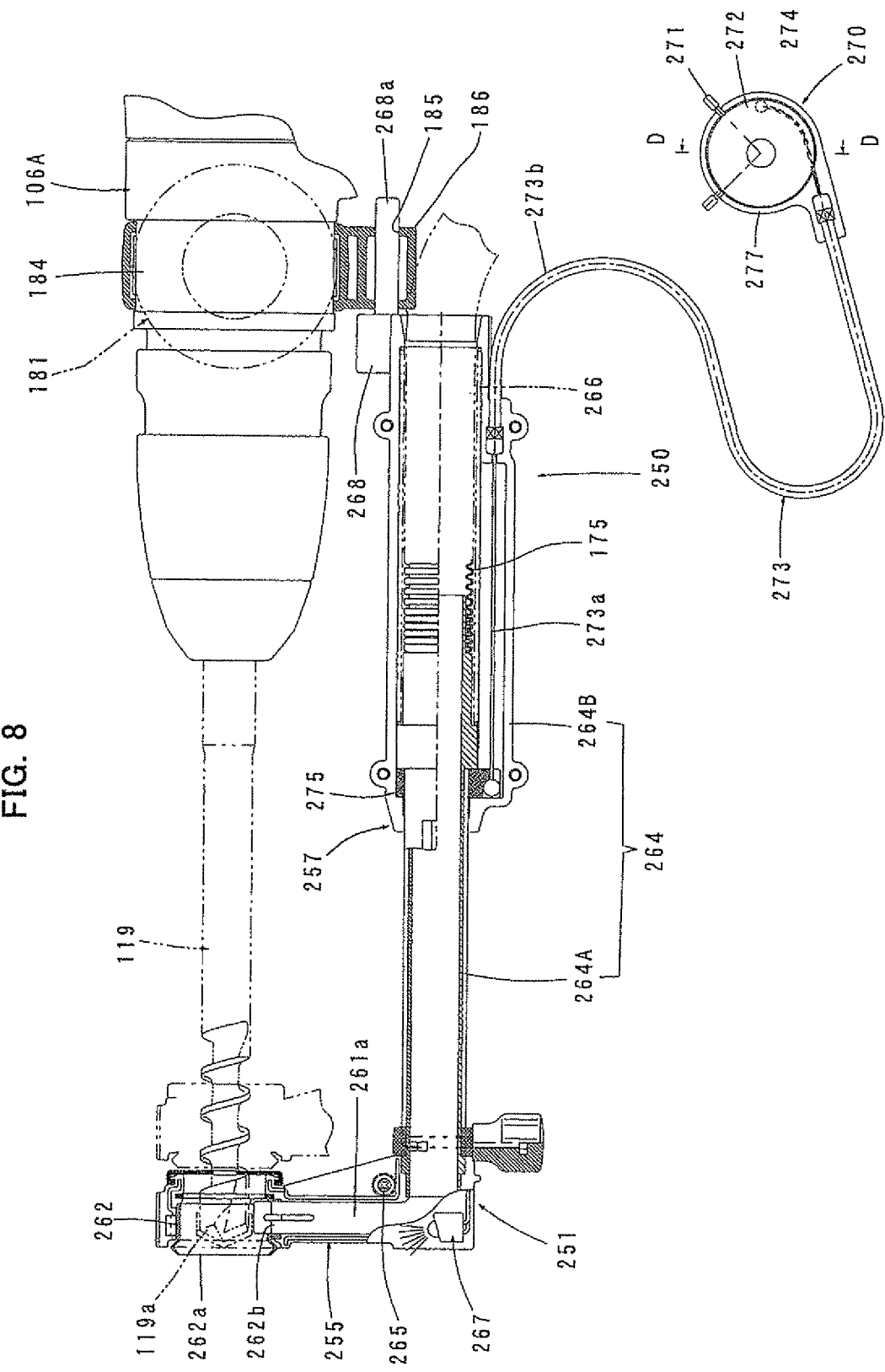
FIG. 8 is a view showing the modification relating to the structure of the operating part of the dust suction device.
Figure 9:
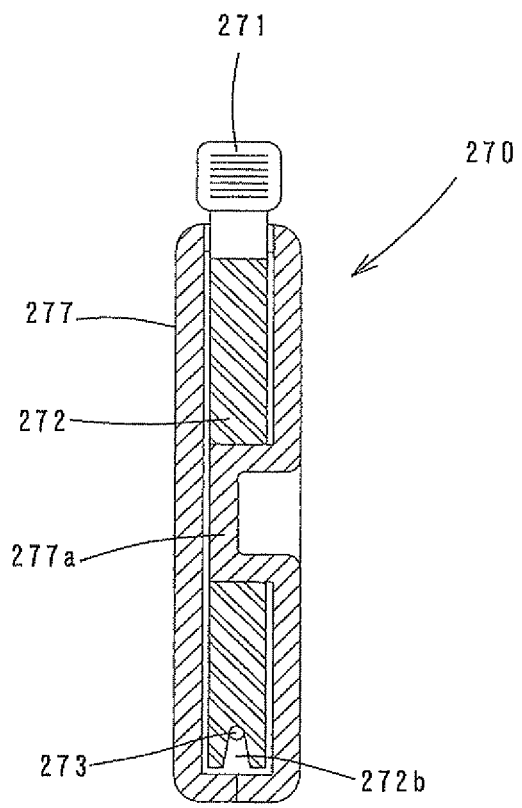
FIG. 9 is a sectional view taken along line D-D in FIG. 8.

In this modification, as shown in FIGS. 8 and 9, the operating part 270 mainly includes the operating lever 271, the disk-like rotary ring 272 having the operating lever 271, and a ring housing 277 in which the rotary ring 272 is rotatably housed. The ring housing 277 is formed separately from the body 103 of the hammer drill 101 and not designed as one of components of the body 103.

As shown in FIG. 9, the ring housing 277 is formed by joining two generally dish-shaped halves together. The rotary ring 272 is housed within the ring housing 277 and pivotally supported by a boss 277a which is formed in the center of the inside of the ring housing 277. The operating lever 271 extends radially from the outer circumferential surface of the rotary ring 272 and protrudes to the outside of the ring housing 277 through a groove formed through a wall of the ring housing and extending in the circumferential direction. One end of the inner wire 273a of the wire rope 273 is engaged with the rotary ring 272 and one end of the outer tube 273b is anchored to the ring housing 277.

On the body 103 side of the hammer drill 101, in order to mount the operating part 270, an operating part installation space is provided both in the vicinity of the side grip 181 or on an outer lateral surface behind and below the side grip and in the vicinity of the handgrip 109 or on a lateral surface (the connection with the motor housing 105) of an upper portion of the handgrip. The above-described operating part 270 (the ring housing 277) can be detachably mounted on the operating part installation space by fastening means such as screws and hooks which are not shown. Therefore, the side grip 181 and the handgrip 109 of this modification are features that correspond to the "grip part" in this invention.

Specifically, in this modification, the operating part 270 of the dust suction device 250 can be selectively mounted to either one of the operating part installation spaces located in the vicinities of the side grip and the handgrip. Therefore, the user can mount the operating part 270 to one of the operating part installation spaces which is easier for the user to use and can move the suction part 255 rearward to expose the bit tip 119a to the outside.

Further, as shown in FIG. 7, the handgrip 109 is configured as a looped handle (D-shaped handle) in which the upper and lower ends of the grip part 121 extending in the vertical direction transverse to the axial direction of the hammer bit 119 are connected to the rear of the motor housing 105. The handgrip 109 is designed as a vibration-proof handle in which a lower connection 123 of the handgrip 109 is connected to the motor housing 105 such that it can pivot on a pivot 124 in the longitudinal direction of the hammer drill and an upper connection 122 is elastically connected to the motor housing 105 via an elastic member in the form of a coil spring 125.

Operation on a workpiece is performed with the handgrip 109 pressed in the forward direction in which the hammer bit 119 is pressed against the workpiece. At this time, the handgrip 109 relatively pivots on the pivot 124 toward the body 103, which causes variations of the distance between the operating lever 271 and the dust transfer tubular member 264 in the axial direction of the tool bit. According to this modification, however, with the construction in which the operating lever 271 and the inner tube 264A of the dust transfer tubular member 264 are connected to each other via the wire rope 273, the variations in the distance as described above can be accommodated by the wire rope 273, so that such variations have no adverse effect on the dust suction device 250.

Figure 10:
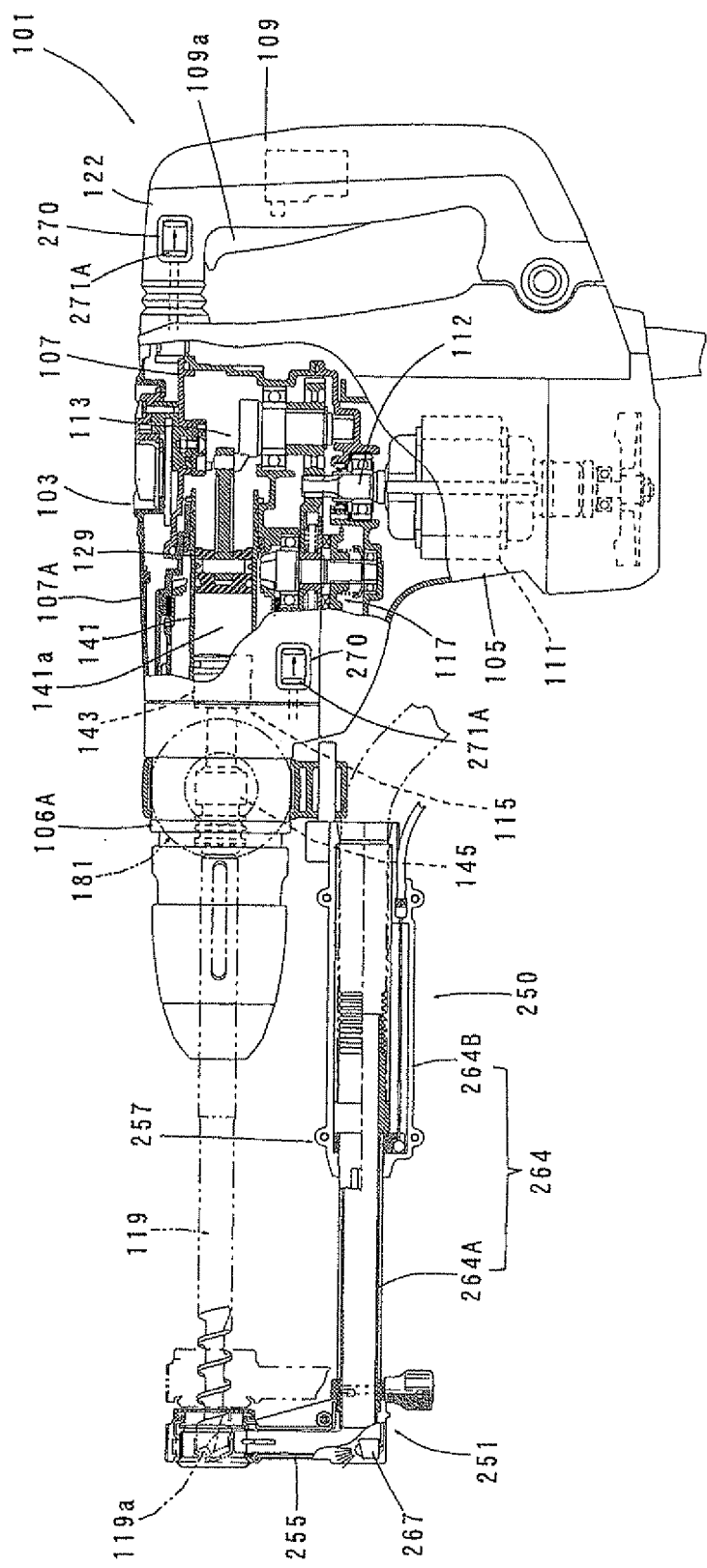
FIG. 10 is a view showing a modification relating to installation of the operating part of the dust suction device.

A modification shown in FIG, 10 is now explained. In this modification, the operating part 270 of the operation mechanism part 253 is built into the body 103 in the vicinity of the side grip 181 or into the upper connection 122 which connects the handgrip 109 and the body 103. In the other points, it has the same construction as the above-described embodiment. Therefore, components or elements of the hammer drill 101 and the dust suction device 250 shown in FIG. 10 are given like numerals as in the above-described embodiment and are not described. Further, in FIG. 10, for the sake of convenience of explanation, the operating part 270 is shown at two locations in the vicinity of the side grip 181 and on the upper connection 122 of the handgrip 109, but actually, the operating part 270 is not provided at the both locations.

In this modification, the operating part 270 of the operation mechanism part 253 is of a slide type in which an operating lever 271A is slid in the longitudinal direction (the axial direction of the hammer bit 119). When the operating lever 271A is slid rearward, the suction part 273 is moved rearward together with the inner tube 264A of the dust transfer tubular member 264 via the wire rope 273, so that the bit tip 119a is exposed to the outside.

According to this modification, the user can operate the operating lever 271A with the hand holding the side grip 181 or the hand holding the handgrip 109 in order to expose the bit tip 119a to the outside through the dust suction part 255 and check the position of the bit tip. Further, even in the construction in which the operating part 270 is built into the body 103 or the upper connection 122, the wire rope 273 can be easily installed by utilizing the internal space of the body 103 and can be prevented from getting damaged by external force. Therefore, the side grip 181 and the handgrip 109 according to this modification are features that correspond to the "grip part" in this invention.

Further, although not shown, a different modification can be designed for a construction in which the side grip 181 is not provided, or specifically in which the user directly holds the barrel cover 106A with the hand different from the hand holding the handgrip 109. In this modification, the operating part 270 of the operation mechanism part 253 can be detachably mounted on the barrel cover 106A or in the vicinity of the barrel cover 106A such that the user can operate the operating lever 271 by the hand holding the barrel cover 106A. In this case, the operating part 270 includes a ring housing in which the disk-like rotary ring 272 having the operating lever 271 is rotatably housed. The above-described barrel cover 106A is a feature that corresponds to the "grip part" and the "barrel" in this invention.

(Second Embodiment of the Invention)

A second embodiment of the invention is now explained with reference to FIGS. 11 to 17. This embodiment is a modification relating to a dust suction device 350, and particularly, a dust suction unit 351 is not of a type that covers only the bit tip 119*a* placed in the front position, but of a bellows type that entirely covers the hammer bit 119.

The dust suction device 350 according to this embodiment mainly includes the dust suction unit 351 that sucks and collects dust generated during operation, and the operation mechanism part 253 (see FIG. 14) that is operated to retract the dust suction unit 351 toward the body 103 in order to expose the bit tip 119*a*. The dust suction unit 351 is a feature that corresponds to the "dust suction part" in this invention. The operation mechanism part 253 is a feature that corresponds to the "operation mechanism" and the "operation mode switching mechanism" in this invention. Further, the operation mechanism part 253 of this embodiment has substantially the same construction as the operation mechanism part 253 of the first embodiment, and therefore, it is given like numerals as in the first embodiment and only briefly described.

The dust suction unit 351 mainly includes a dust suction part 355 for sucking dust and a transfer part 357 for transferring dust sucked by the suction part 355. The suction part 355 and the transfer part 357 are features that correspond to the "suction part" and the "dust transfer part", respectively, in this invention. The suction part 355 mainly includes a generally cylindrical dust suction sleeve 361 made of rubber and is slidably connected, for example, to a fixed sleeve 363 made of hard synthetic resin via a movable sleeve 365. The dust suction sleeve 361, the fixed sleeve 363 and the movable sleeve 365 are coaxially disposed. The fixed sleeve 363 is a feature that corresponds to the "fixed part" in this invention. The dust suction sleeve 361 has both ends open in the longitudinal direction and is formed by a bellows-like rubber tubular member which can extend and contract in the axial direction of the hammer bit 119. The fixed sleeve 363 has a generally conical shape having both ends open in the longitudinal direction.

Figure 12:
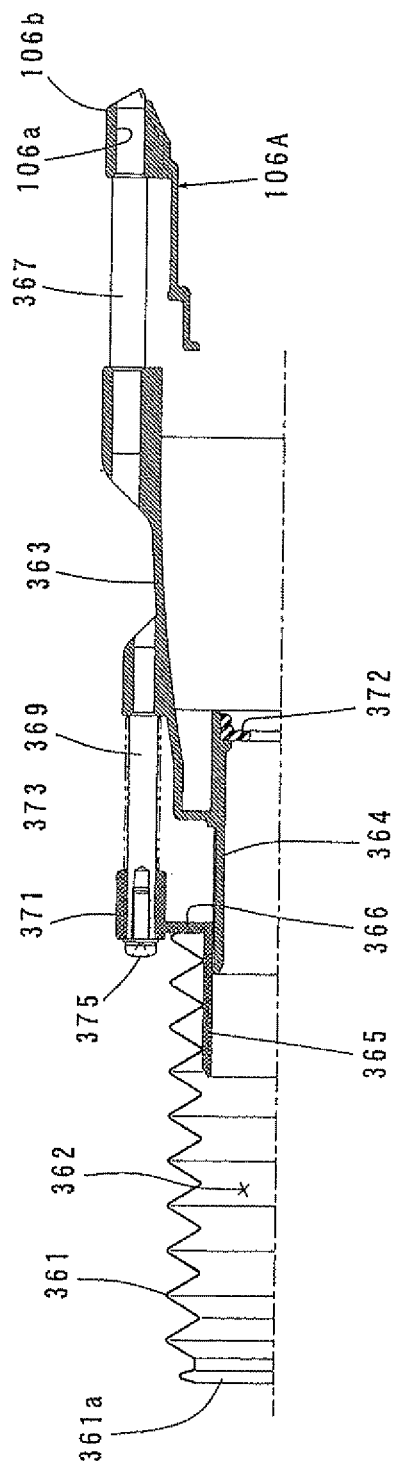
FIG. 12 is a sectional view showing a dust suction unit.
Figure 16:
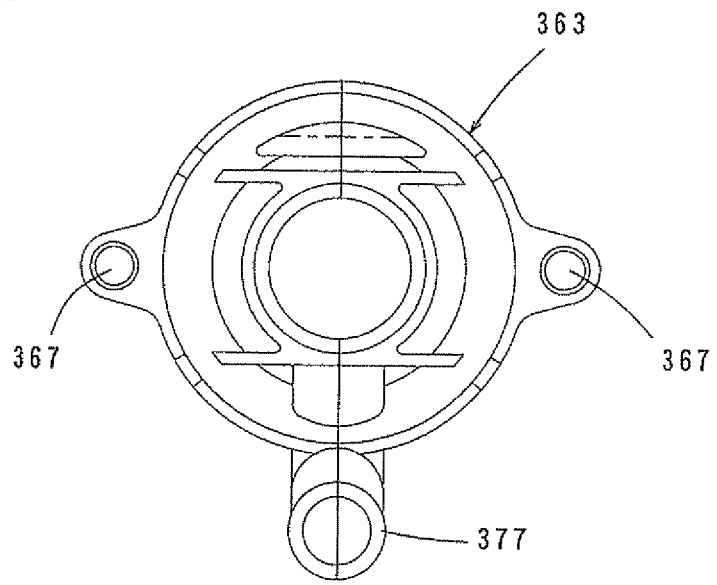
FIG. 16 is a view showing the fixed sleeve as viewed from the rear (body side).

As shown in FIGS. 12 and 16, the fixed sleeve 363 is mounted to the barrel cover 106A via two right and left mounting rods 367 extending in the longitudinal direction of the fixed sleeve 363 (only one of the two mounting rods is shown in FIG. 12). The two mounting rods 367 are longitudinally extending members having a circular section and spaced about 180 degrees apart in the circumferential direction, and extend rearward in parallel to each other along the outer surface of the barrel cover 106A. Further, the extending ends (rear ends) of the mounting rods 367 are removably inserted into two right and left mounting holes 106*a* formed in a rear end of the barrel cover 106A, so that the fixed sleeve 363 and thus the dust suction unit 351 is detachably mounted to the body 103. Further, the mounting holes 106*a* are formed in a jut 106*b* jutting out from the barrel cover 106A. Front ends of the two mounting rods 367 are fixed to the fixed sleeve 363, for example, by press fitting into holes formed in the rear end of the outer surface of the fixed sleeve 363, or by insert molding in the process of forming the fixed sleeve 363.

Figure 11:
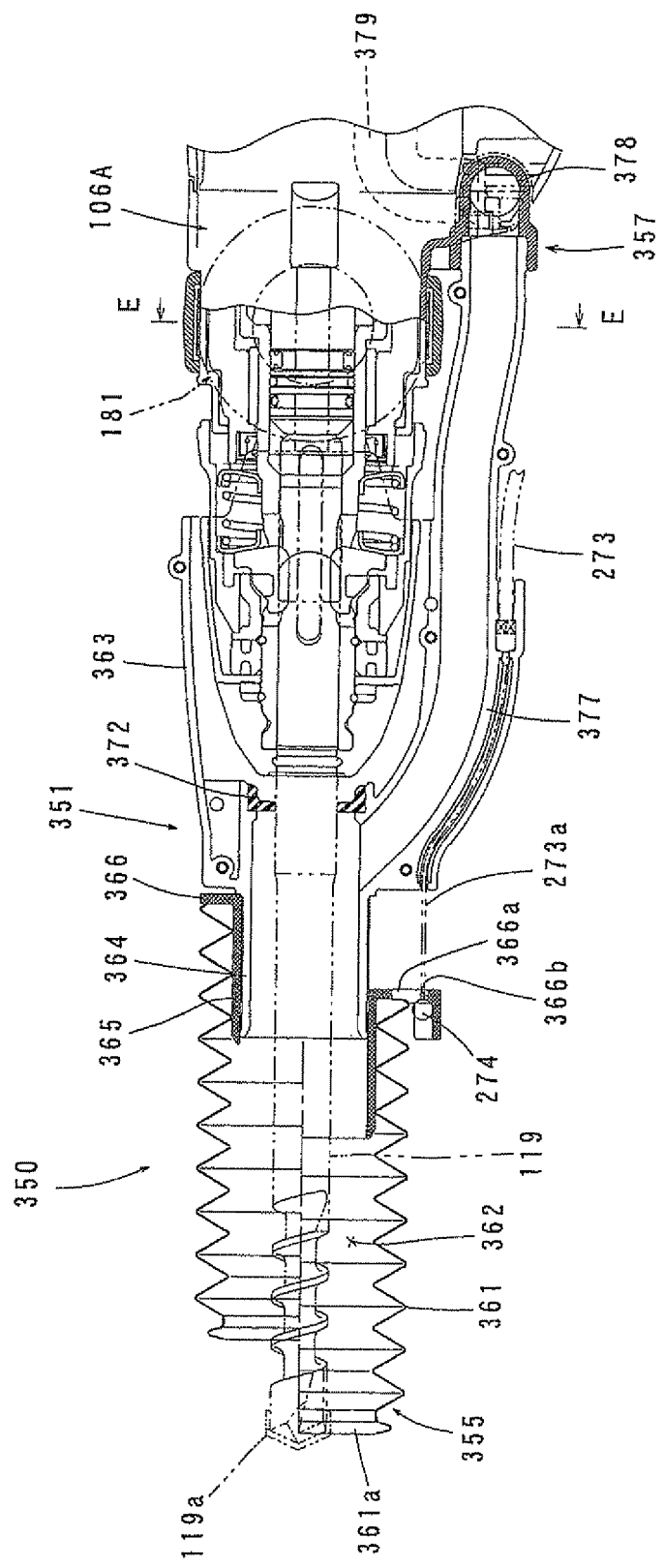
FIG. 11 is a sectional view showing a dust suction device according to a second embodiment of the invention.

When the fixed sleeve 363 is mounted to the barrel cover 106A, the dust suction sleeve 361 is disposed in such a manner as to cover the hammer bit 119 (see FIG. 11). The dust suction sleeve 361 disposed in this manner entirely covers the hammer bit 119 and forms a dust passage 362 (space) between the outer surface of the hammer bit 119 and the dust suction sleeve 361. A front (left as viewed in FIG. 11) open end of the dust suction sleeve 361 is designed as a dust suction port 361*a* and the other open end is fixedly fitted onto the movable sleeve 365.

The movable sleeve 365 is a cylindrical member having both ends open and slidably fitted onto the outer surface of a front end cylindrical portion 364 formed in a front end region of the fixed sleeve 363. With such a construction, the dust suction sleeve 361 can be moved between the front position to entirely cover the hammer bit 119 and the rear position to expose the bit tip 119*a*, via the movable sleeve 365. Specifically, the front end cylindrical portion 364 of the fixed sleeve 363 serves as a guide member for guiding the dust suction sleeve 361 to move together with the movable sleeve 365. The front position in which the dust suction sleeve 361 entirely covers the hammer bit 119 and the rear position are features that correspond to the "first position" and the "second position", respectively, in this invention. Further, the movable sleeve 365 and the front end cylindrical portion 364 form the "main guide" in this invention, and the movable sleeve 365 and the front end cylindrical portion 364 are features that correspond to the "movable cylindrical element" and the "fixed-side cylindrical portion", respectively, in this invention. Further, in FIG. 11, upper halves of the dust suction sleeve 361 and the movable sleeve 365 are shown placed in the rear position and lower halves are shown placed in the front position.

Figure 15:
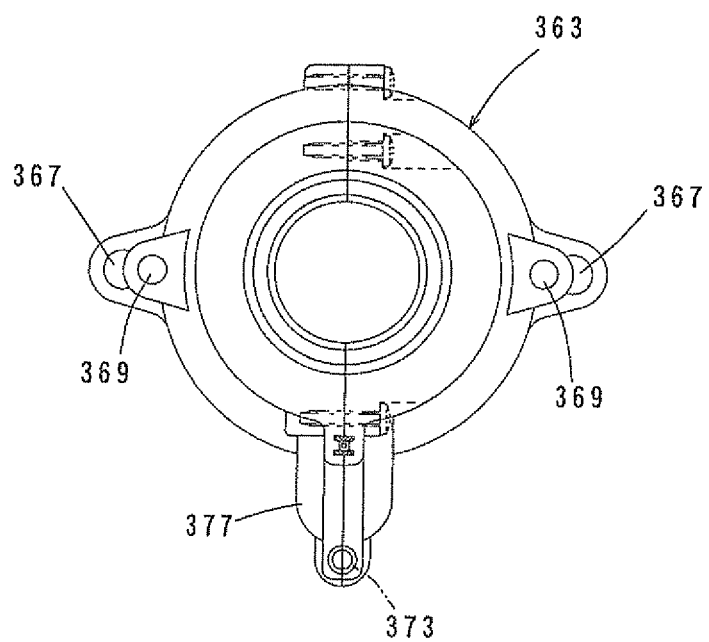
FIG. 15 is a view showing a fixed sleeve as viewed from the front (tip side).

As shown in FIGS. 12 and 15, two right and left guide rods 369 (only one of the two rods is shown in FIG. 12) are fixedly provided on the fixed sleeve 363 and extend in the longitudinal direction of the fixed sleeve 363. The two guide rods 369 are longitudinally extending members having a circular section and spaced about 180 degrees apart in the circumferential direction, and the guide rods 369 extend laterally in parallel to the front end cylindrical portion 364 toward the movable sleeve 365. A flange 366 is formed on the rear end of the outer surface of the movable sleeve 365 and extends radially outward. The flange 366 has sliding cylindrical parts 371 which are slidably fitted onto the associated guide rods 369. The guide rod 369 and the sliding cylindrical part 371 form the "auxiliary guide" in this invention, and the guide rod 369 and the sliding cylindrical part 371 are features that correspond to the "guide rail" and the "slider", respectively, in this invention. The movable sleeve 365 and the front end cylindrical portion 364 as well as the guide rod 369 and the sliding cylindrical part 371 form the "sliding part" in this invention.

As shown in FIG. 12, the dust suction sleeve 361 is constantly biased forward by biasing forces of biasing springs in the form of compression coil springs 373 disposed around the guide rods 369. The compression coil springs 373 are elastically disposed between the fixed sleeve 363 and the movable sleeve 365 around the respective guide rods 369. A stopper member 375 formed by a screw is provided on a front end of each of the guide rods 369, so that the dust suction sleeve 361 biased by the biasing forces of the compression coil springs 373 is placed in the front position to cover the hammer bit 119.

Dust sucked into the dust suction sleeve 361 is transferred rearward (downstream) through the passage 362 and sucked into a dust collector (not shown) via a transfer part 357. As shown in FIG. 11, the transfer part 357 mainly includes a transfer pipe 377 having a circular section and an internal transfer tube 379 (partly shown by dashed lines in FIG. 11). The transfer pipe 377 is integrally formed with the fixed sleeve 363 and extends rearward and it communicates with the passage 362 of the dust suction sleeve 361. The internal transfer tube 379 is connected to an extending end (rear end) of a transfer pipe 377 via a pipe joint 378 integrally formed with the barrel cover 106A and is disposed inside the body 103 of the hammer drill 101. The internal transfer tube 379 can be connected to the dust collecting hose of the dust collector. Further, the transfer pipe 377 can be disconnected from the pipe joint 378. A seal ring 372 is installed inside the fixed sleeve 363 and held in sliding contact with an outer surface of a shank of the hammer bit 119, so that dust is prevented from entering the body 103.

Figure 13:
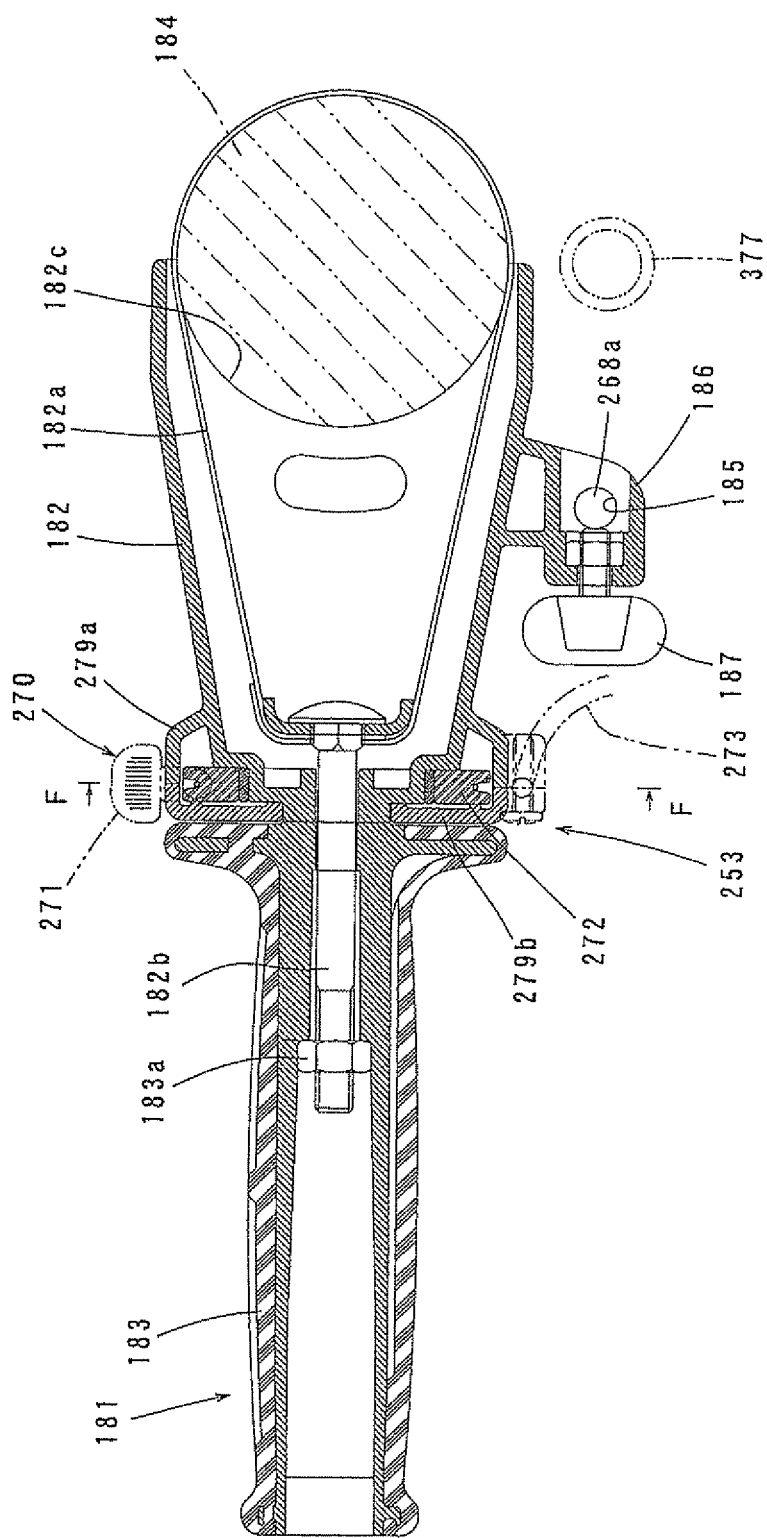
FIG. 13 is a sectional view taken along line E-E in FIG. 11.
Figure 14:
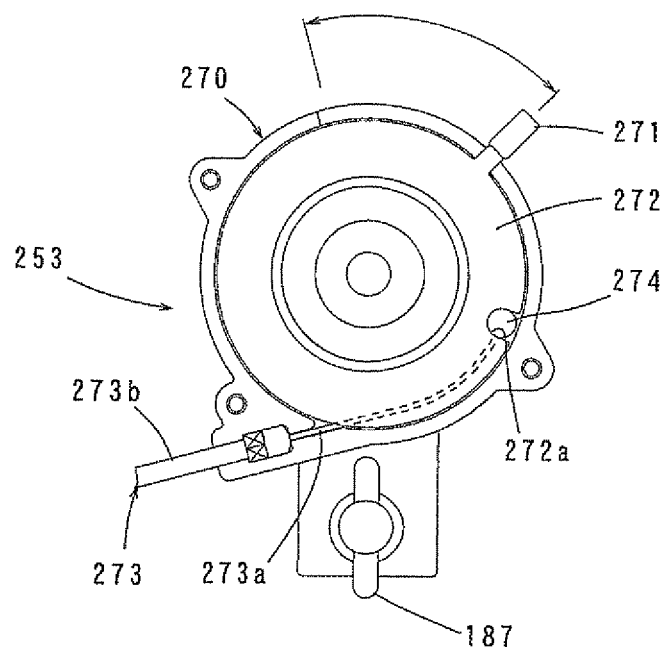
FIG. 14 is a sectional view taken along line F-F in FIG. 13.

As shown in FIG. 14, the operation mechanism part 253 mainly includes the operating part 270 and the wire rope 273 for transmitting the movement of the operating part 270 to the dust suction sleeve 361. The operating part 270 and the wire rope 273 are features that correspond to the "operating part" and the "linkage", respectively, in this invention. The operating part 270 includes the operating lever 271 and the disk-like rotary ring 272 having the operating lever 271 and as shown in FIG. 13, like the first embodiment, the operating part 270 is detachably mounted to the side grip 181.

Figure 17:
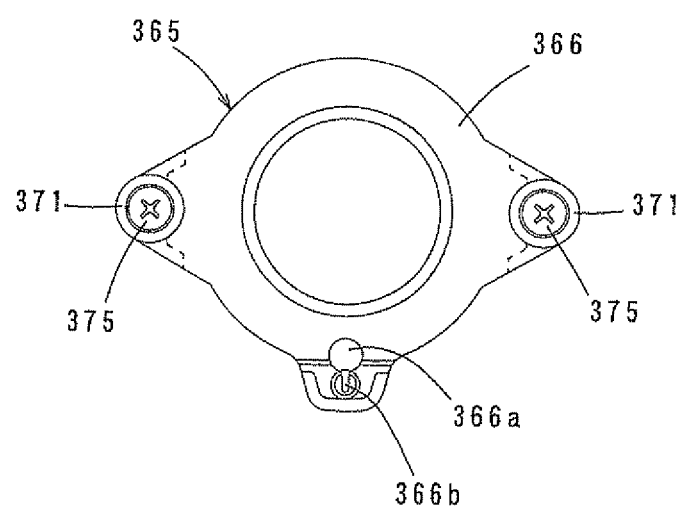
FIG. 17 is a view showing a movable sleeve as viewed from the front (tip side).

The wire rope 273 includes the inner wire 273a and the outer tube 273b. The inner wire 273a has the spherical engagement parts 274 on its both ends. One of the engagement parts 274 is engaged with the engagement recess 272a of the rotary ring 272 and the other engagement part 274 is connected to the flange 366 at a midpoint between the right and left sliding cylindrical parts 371 in the circumferential direction of the movable sleeve 365 (see FIG. 11). As shown in FIG. 17, the flange 366 has a large-diameter hole 366a through which the engagement part 274 of the inner wire 273a is allowed to pass, and a small-diameter hole 366b through which it is not allowed to pass. The engagement part 274 is passed through the large-diameter hole 366a and then led to the small-diameter hole 366b and engaged with an edge of the small-diameter hole 366b. In this state, the dust suction sleeve 361 is fitted over the movable sleeve 365. At this time, the rear end of the dust suction sleeve 361 faces the large-diameter hole 366a, so that the engagement part 274 is prevented from moving from the small-diameter hole 366b back to the large-diameter hole 366a. With such a construction, the end of the inner wire 273a can be rationally connected to the movable sleeve 365 without using fastening means such as a screw. The other engagement part 274 of the inner wire 273a is a feature that corresponds to the "wire stopper" in this invention.

As described above, the plurality of components forming the operation mechanism part 253 are mounted to the plurality of components forming the dust suction unit 351. Specifically, the components of the dust suction unit 351 and the components of the operation mechanism part 253 are assembled together, so that a dust suction assembly is formed.

The dust suction device 350 according to this embodiment is constructed as described above. Therefore, when the user performs, for example, a drilling operation on a workpiece (concrete wall) by using the hammer drill 101 while driving the dust collector, the user holds the handgrip 109 with one hand and turns the operating lever 271 counterclockwise as viewed in FIG. 14 while holding the side grip 181 with the other hand. At this time, the movable sleeve 365 is slid rearward along the front end cylindrical portion 364 of the fixed sleeve 363 via the inner wire 273a. Thus, the dust suction sleeve 361 which is integrated with the movable sleeve 365 is retracted to the rear position while maintaining its longitudinal length without contracting, so that the bit tip 119a is exposed through the suction part 355. This state is a feature that corresponds to the "second operation mode" in this invention. Thus, the user can visually check the position of the bit tip 119a while maintaining the exposed state and then position the bit tip 119a on a point of the workpiece to be drilled.

When the external force applied to the operating lever 271 is released after this positioning, the dust suction sleeve 361 is moved to the front position to entirely cover the bit tip 119a by the biasing force of the compression coil spring 373 and pressed against the surface of the workpiece, and the operating lever 271 is returned to its initial position. In this state, the dust suction sleeve 361 is allowed to arbitrarily move between the front and rear positions. This state is a feature that corresponds to the "first operation mode" in this invention. In this state, when the trigger 109a is depressed, the hammer drill 101 is driven to perform a drilling operation by causing the hammer bit 119 to perform hammering movement in its axial direction and drilling movement in its circumferential direction. During this operation, dust generated by the operation is sucked into the dust suction sleeve 361 and transferred to the dust collector via the transfer pipe 377 and the internal transfer tube 379 and then collected in the dust collector. The dust suction sleeve 361 pressed by the workpiece retracts by contraction of the dust suction sleeve itself and by sliding movement of the movable sleeve 365 with respect to the fixed sleeve 363 as the drilling operation proceeds. In the above description, the position to which the operating lever 271 is turned and the initial position in which the operating lever 271 is initially placed before turning operation are features that correspond to the "second operation position" and the "first operation position", respectively, in this invention.

As described above, according to this embodiment, while holding the handgrip 109 and the side grip 181 of the hammer drill 101, the user can operate the operating lever 271 by the hand holding the side grip 181 and stop the bit tip 119a at the position in which the bit tip 119a is exposed through the dust suction part 255, so that the user can visually check the position of the bit tip 119a. Thus, the usability in operation is enhanced.

Further, according to this embodiment, with the construction in which the dust suction sleeve 361 has a bellows-like structure which can extend and contract and slides with respect to the fixed sleeve 363 via the movable sleeve 365, the movement of the dust suction sleeve 361 with respect to the fixed sleeve 363 can be smoothly performed.

Further, according to this embodiment, in addition to the construction in which the movable sleeve 365 is slidably fitted onto the front end cylindrical portion 364 of the fixed sleeve 363, the auxiliary guide part is provided in which the sliding cylindrical portion 371 is formed on the movable sleeve 365 and slides along the guide rod 369 provided on the fixed sleeve 363. Therefore, even though a point of the movable sleeve 365 in the circumferential direction is pulled rearward by the wire rope 273, the movable sleeve 365 can slide with stability without twisting, so that the sliding structure can be reduced in size by shortening its sliding region in the longitudinal direction. Particularly, in this embodiment, the two auxiliary guide parts are spaced about 180 degrees apart in the circumferential direction, so that the stability of the sliding movement is further improved.

Further, in the second embodiment, the operating part 270 of the operation mechanism part 253 is disposed in the side grip 181, but it may be disposed in a grip part of the hammer drill other than the side grip 181, such as the handgrip, the barrel and their vicinity.

(Third Embodiment of the Invention)

Figure 18:
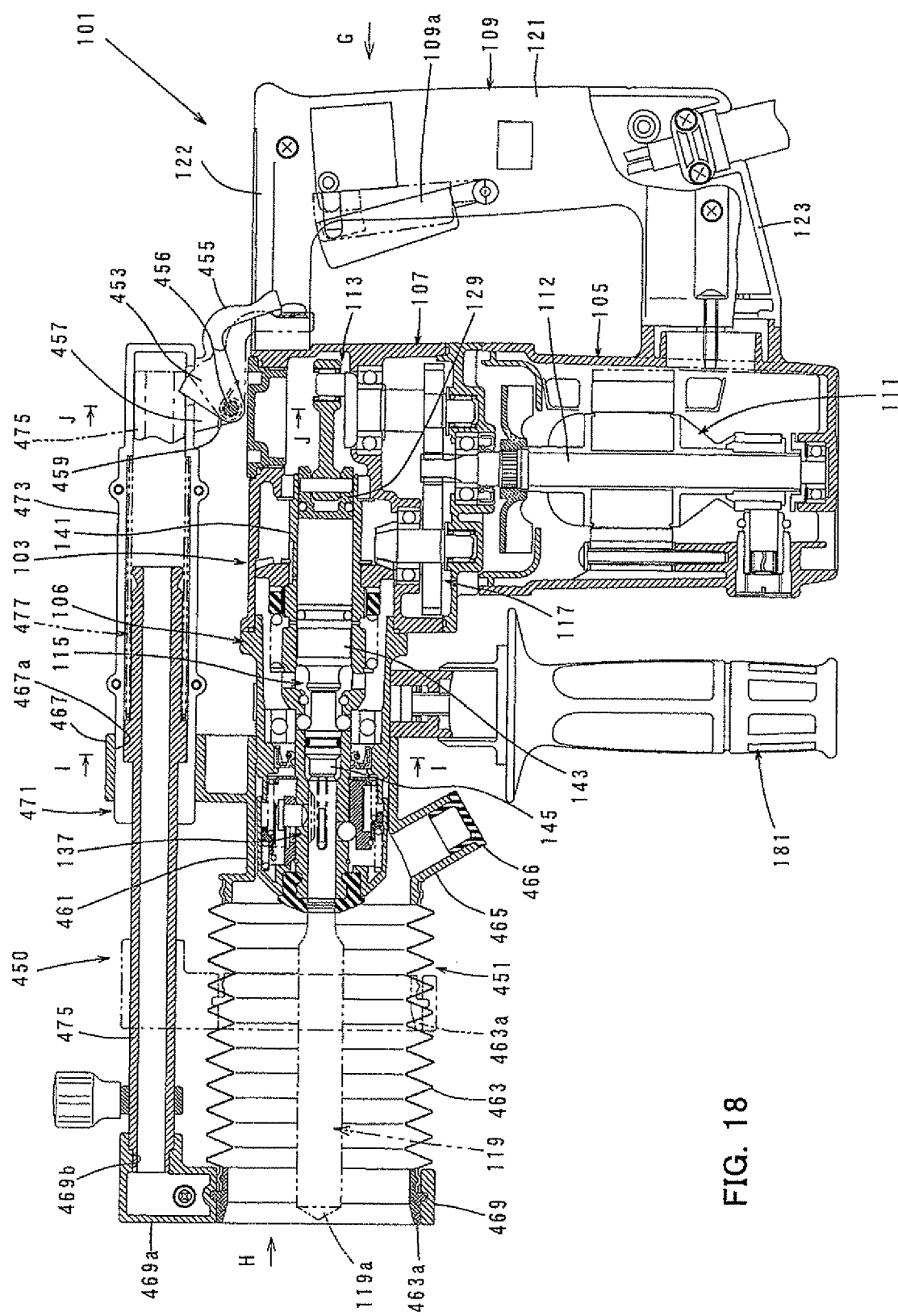
FIG. 18 is a sectional side view showing the entire structure of the hammer drill with a dust suction device according to a third embodiment of the invention.
Figure 19:
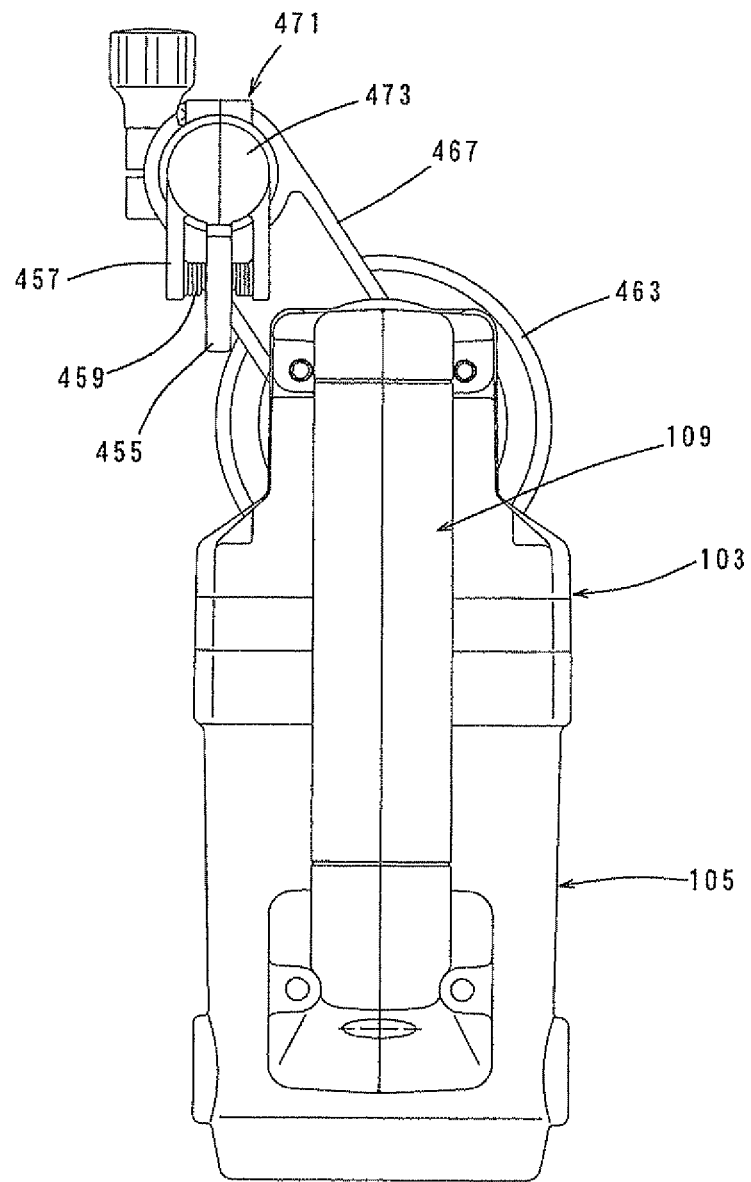
FIG. 19 is a view as viewed from the direction shown by the arrow G in FIG. 18.
Figure 20:
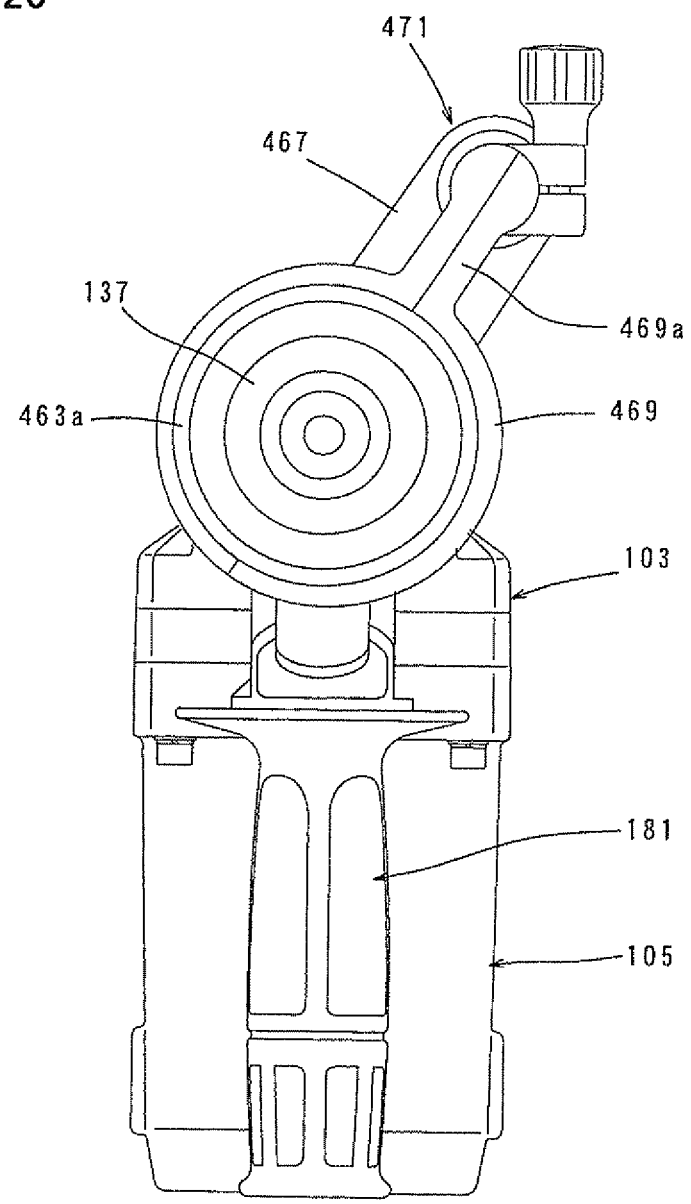
FIG. 20 is a view as viewed from the direction shown by the arrow H in FIG. 18.

A third embodiment of the invention is now explained with reference to FIGS. 18 to 23. This embodiment is a modification relating to a dust suction device 450. The hammer drill 101 has the same construction as the above-described first embodiment, and therefore, it is given like numerals as in the first embodiment and not described. However, a tool holder which is not shown in the first embodiment is shown in FIG. 18 and designated by numeral 137.

The dust suction device 450 which is mounted to the hammer drill 101 and serves to suck dust generated during drilling operation on a workpiece is now explained. The dust suction device 450 according to this embodiment mainly includes a dust suction unit 451, a locking arm 453 and a lock releasing lever 455. The dust suction unit 451 covers the hammer bit 119 and sucks and collects dust generated during drilling operation. When a dust suction sleeve 463 of the dust suction unit 451 is moved from a front position (shown by a solid line in FIG. 18) to cover the hammer bit 119 to a rear position (shown by two-dot chain line in FIG. 18) to expose the bit tip 119a of the hammer bit 119, the locking arm 453 serves to lock the dust suction sleeve 463 in the rear position. The lock releasing lever 455 serves to release the dust suction sleeve 463 locked by the locking arm 453. The dust suction unit 451, the locking arm 453 and the lock releasing lever 455 are features that correspond to the "dust suction part", the "locking member" and the "lock releasing member", respectively, in this invention. Further, the locking arm 453 and the lock releasing lever 455 form the "dust suction part locking mechanism" and the "operation mode switching mechanism" in this invention.

The dust suction unit 451 includes a cylindrical fixed sleeve 461 which is detachably fitted onto an outer circumferential surface of the barrel 106 (or the barrel cover) forming the front end region of the body 103, a dust suction sleeve 463 which is connected to a front end of the fixed sleeve 461 and, during drilling operation, pressed against the workpiece together with the hammer bit 119 and sucks dust, and a sliding guide 471 which guides movement of the dust suction sleeve 463. The fixed sleeve 461, the dust suction sleeve 463 and the sliding guide 471 are features that correspond to the "fixed part", the "suction part" and the "guide part", respectively, in this invention.

The dust suction sleeve 463 is formed by a bellows-like rubber tubular member which can extend and contract, and is disposed to entirely cover the hammer bit 119. One end (rear end) of the dust suction sleeve 463 in the longitudinal direction is fitted onto the front end of the fixed sleeve 461 so that the dust suction sleeve 463 is connected to the fixed sleeve 461. Further, a ring-like suction port 463a for sucking dust is provided on the other end (front end) of the dust suction sleeve 463 and designed as a region that can't extend and contract. A dust discharge nozzle 465 is provided on a front end portion of the fixed sleeve 461 and serves to discharge dust which is sucked through the suction port 463a and transferred rearward through the internal space of the dust suction sleeve 463. Although not shown, a dust collecting hose of a dust collector is removably connected to the dust discharge nozzle 465. Further, in FIG. 18, an outlet of the dust discharge nozzle 465 is closed by a detachable cap (plug) 466. The cap 466 is used when the hammer drill 101 is used without being connected to the dust collector, or specifically, when the dust suction sleeve 463 is used as a member for receiving (catching) dust generated during drilling operation, or when the hammer drill 101 is stored.

The hammer drill 101 is most commonly used for a drilling operation on a pre-marked point of a workpiece. For this purpose, prior to the drilling operation, at least the bit tip 119a has to be exposed through the front end of the dust suction sleeve 463. In this embodiment, in order to expose the bit tip 119a, the user holds the dust suction sleeve 463 or, for example, a region of the suction port 463a with the hand and contracts or moves it to a rearmost position. In this state, the user locks the dust suction sleeve 463 in the rearmost position so that the bit tip 119a can be held exposed to the outside. Thereafter, when the user appropriately releases the lock, the dust suction sleeve 463 moves (returns) to the front position to cover the bit tip. This construction is now explained. Further, the front position of the dust suction sleeve 463 to cover the bit tip 119a and the rear position of the dust suction sleeve 463 to expose the bit tip 119a are features that correspond to the "first position" and the "second position", respectively, in this invention.

As shown in FIG. 18, the sliding guide 471 for guiding the extending and contracting movement of the dust suction sleeve 463 is disposed above the hammer bit 119 and extends in parallel to the hammer bit 119. The sliding guide 471 includes an elongate tubular outer rail (outer tube) 473 having an open front end, an elongate tubular inner rail (inner tube) 475 which is slidably inserted into the outer rail 473 and has a front end region extending forward of the outer rail 473, and a biasing member in the form of a compression coil spring 477 which biases the inner rail 475 to move forward or biases the dust suction sleeve 463 toward the front position in which the dust suction sleeve covers the hammer bit 119.

Figure 21:
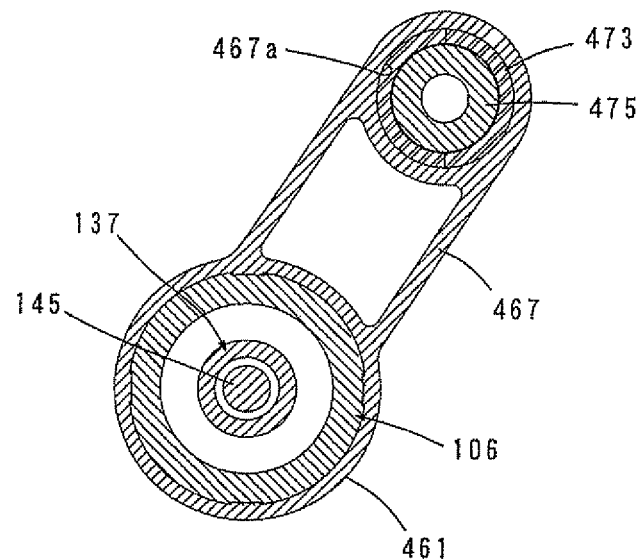
FIG. 21 is a sectional view taken along line I-I in FIG. 18.
Figure 22:
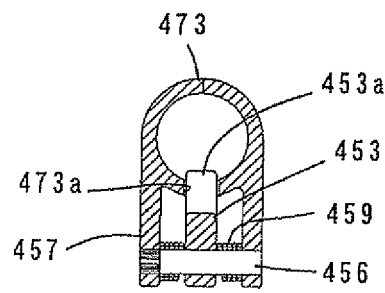
FIG. 22 is a sectional view taken along line J-J in FIG. 18.
Figure 23:
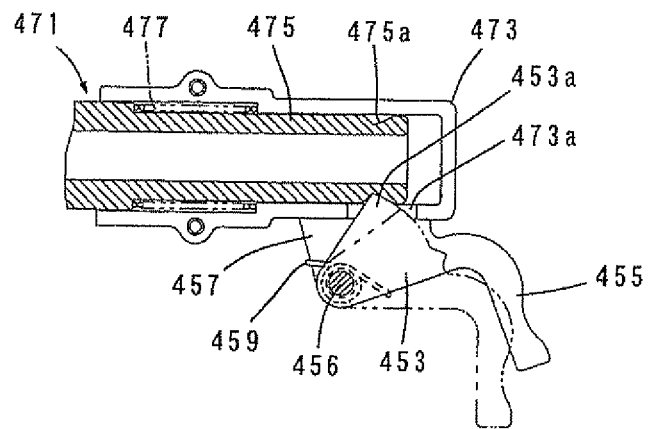
FIG. 23 is a partial view showing a state in which a dust suction sleeve is moved to a rear position to expose a hammer bit and locked therein.

The outer rail 473 is supported by the protruding support part 467 which is integrally formed on the outer surface of the fixed sleeve 461 of the dust suction unit 451 and protrudes radially outward (upward) (see FIGS. 18 and 21). A front end of the inner rail 475 is connected to a ring member 469 which is fitted onto the suction port 463a of the dust suction sleeve 463 (see FIGS. 18 and 20). Therefore, the inner rail 475 slides (telescopes) within the outer rail 473 in synchronization with the extending and contracting movement of the dust suction sleeve 463 and thus smoothly guides the extending and contracting movement of the dust suction sleeve 463. Further, as shown in FIG. 21, the protruding support part 467 has a through hole 467a in its protruding end and a front end of the outer rail 473 is inserted through the through hole 467a and fixed thereto. The ring member 469 has a projection 469a (see FIG. 20) extending obliquely upward, and a mounting hole 469b (see FIG. 18) having an open rear end is formed in the projection 469a. A front end of the inner rail 475 is inserted into the mounting hole 469b and connected thereto. The compression coil spring 477 is disposed within the outer rail 473 such that one end is fixed to or held in contact with the outer rail 473 and the other end is fixed to or held in contact with the inner rail 475. Therefore, the contracting of the dust suction sleeve 463 and the inner rail 475 is effected by compressing the compression coil spring 477, and the extending of the dust suction sleeve 463 and the inner rail 475 is effected by the biasing force of the compression coil spring 477.

Further, as shown in FIG. 18, the generally fan-shaped locking arm 453 is provided on the rear of the outer rail 473 and serves to lock the dust suction sleeve 463 in the rear position by engaging with the inner rail 475 when the inner rail is moved rearward together with the dust suction sleeve 463. Specifically, a downwardly protruding bifurcate arm mounting part 457 (see FIG. 22) is integrally formed on the outer surface of the rear end portion of the outer rail 473, and the locking arm 453 is mounted to the arm mounting part 457 via a support shaft 456 such that it can pivot on the support shaft 456 in the vertical direction. The locking arm 453 has an engagement protrusion 453a on its front (upper) end, and the engagement protrusion 453a protrudes into the outer rail 473 through an opening 473a of the outer rail 473. Further, an annular engagement groove 475a is formed around a rear end portion of the inner rail 475. When the inner rail 475 is moved rearward, the engagement protrusion 453a of the locking arm 453 is engaged with the engagement groove 475a, so that the dust suction sleeve 463 is locked (fixed) in the rear position.

A locking spring in the form of a torsion spring 459 is disposed around the support shaft 456 and serves to constantly bias the locking arm 453 such that the locking arm pivots upward. With such a construction, the locking arm 453 is biased such that the engagement protrusion 453a engages with the engagement groove 475a of the inner rail 475. Further, one end of the torsion spring 459 is engaged with the arm mounting part 457 and the other end is fixedly engaged with the locking arm 453.

The locking arm 453 has the lock releasing lever 455 formed in one piece. The lock releasing lever 455 extends downward from the front end portion of the locking arm 453 and can be pressed forward by the user's finger. Therefore, when the user presses the lock releasing lever 455 forward, the lock releasing lever 455 pivots on the support shaft 456 together with the locking arm 453, so that the locking arm 453 can be disengaged from the inner rail 475.

The outer rail 473 extends above the body 103 and toward the upper connection of the handgrip 109. The rear end portion of the outer rail 473 is disposed above and to the left of the handgrip 109 when the hammer drill 101 is viewed from the rear or the handgrip 109 side (see FIG. 19). Therefore, the extending end (lower end) of the lock releasing lever 455 mounted to the outer rail 473 is disposed in a location adjacent to the grip part 121 of the handgrip 109, or specifically in a region such that the lock releasing lever 455 can be operated by the user's hand holding the grip part 121. Further, the trigger 109a is disposed on the grip part 121 of the handgrip 109 and depressed by the user in order to drive the driving motor 111. Specifically, in this embodiment, the user can both depress the trigger 109a and press the lock releasing lever 455 with one hand holding the grip part 121 of the handgrip 109. The trigger 109a is a feature that corresponds to the "motor operating member" in this invention.

Further, as shown in FIG. 18, the generally rod-like side grip 181 is mounted as an auxiliary handle at the rear of the fixed sleeve 461 on the outer surface of the barrel 106 which forms the front end region of the body 103, and the side grip 181 extends in a radial direction transverse to the axial direction of the hammer bit 119. A structure of mounting the side grip 118 to the barrel 106 is well known in the art and therefore its description is omitted.

The dust suction device 450 according to this embodiment is constructed as described above. Therefore, when the user performs a drilling operation on a workpiece (for example, a concrete wall), firstly, while holding the handgrip 109 with one hand (right hand), the user holds the suction port 463a of the dust suction sleeve 463 and moves (contracts) the dust suction sleeve 463 rearward with the other hand (left hand). At this time, the inner rail 475 is moved rearward together with the dust suction sleeve 463 while being guided by the outer rail 473. Then when the engagement groove 475a of the inner rail 475 is opposed to the engagement protrusion 453a of the locking arm 453, the engagement protrusion 453a of the locking arm 453 which is biased by the locking spring engages with the engagement groove 475a (see FIG. 23). In this manner, the dust suction sleeve 463 is moved to the rear position and locked therein, and the bit tip 119a of the hammer bit 119 is exposed to the outside. This state is shown by two-dot chain line in FIG. 18 and is a feature that corresponds to the "second operation mode" in this invention. Thus, the user can visually check the position of the bit tip 119a and then easily position the bit tip 119a on a point of the workpiece to be drilled.

After positioning the bit tip 119a, when the user presses the lock releasing lever 455 forward, the locking arm 453 pivots on the support shaft 456 and the engagement protrusion 453a is disengaged from the engagement groove 475a of the inner rail 475, so that the lock is released. As a result, the dust suction sleeve 463 is moved (extended) to the front position together with the inner rail 475 by the biasing force of the compression coil spring 477, and the suction port 463a is pressed against the surface of the workpiece. In this state, the dust suction sleeve 463 is allowed to arbitrarily move between the front and rear positions. This state is a feature that corresponds to the "first operation mode" in this invention. In this state, when the trigger 109a is depressed, the hammer drill 101 is driven to perform a drilling operation by causing the hammer bit 119 to perform hammering movement in its axial direction and drilling movement in its circumferential direction. Dust generated by the drilling operation is sucked into the internal space of the dust suction sleeve 463 through the suction port 463a and transferred to the dust collector via the dust collecting hose connected to the dust discharge nozzle 465 of the fixed sleeve 461 and collected in the dust collector.

According to this embodiment, as described above, positioning of the bit tip 119a on a point of the workpiece to be drilled can be made with the dust suction sleeve 463 locked in the rear position. After the positioning, the lock is released to return the dust suction sleeve 463 to the front position so that dust can be sucked by the dust suction sleeve. Therefore, when positioning the hammer bit, unlike in a conventional technique, it is not necessary to keep holding the dust suction part placed in the rear position in which the bit tip is exposed to the outside, with the user's hand. Thus the usability in drilling operation is enhanced. Particularly, this construction is effective in a large hammer drill 101 in which both the handgrip 109 and the side grip 181 has to be held by the user to perform a drilling operation.

Further, according to this embodiment, by provision of the construction in which the lock releasing lever 455 is disposed in the vicinity of the handgrip 109, the user can easily operate the lock releasing lever 455 by the hand holding the handgrip 109. Particularly, by provision of the construction in which the lock releasing lever 455 is disposed adjacent to the trigger 109a, the trigger 109a and the lock releasing lever 455 can be operated with the hand holding the handgrip 109. Specifically, one-hand operation can be realized, so that usability can be further improved.

Further, in this embodiment, with the construction in which the sliding guide 471 is disposed at a distance from the hammer bit 119 and extends in parallel to the axis of the hammer bit 119 and it is designed to guide the extending and contracting movement of the dust suction sleeve 463, the stability of the extending and contracting movement of the dust suction sleeve 463 can be ensured.

Further, in this embodiment, the locking aim 453 and the lock releasing lever 455 which form the dust suction part locking mechanism are mounted to the sliding guide 471 forming the dust suction unit 451. Specifically, the components of the dust suction unit 451 and the components of the dust suction part locking mechanism are assembled together, so that a dust suction assembly is formed. By thus assembling the dust suction unit 451 and the dust suction part locking mechanism into the dust suction assembly, they can be handled as one part, so that, for example, ease of mounting them to the tool body can be improved.

(Fourth Embodiment of the Invention)

A fourth embodiment of the invention is now explained with reference to FIGS. 24 to 29. This embodiment is a modification to the dust suction device 450 according to the above-described third embodiment. In this embodiment, a suction part 561 of the dust suction unit 451 is formed in a generally box-like shape and designed to cover only the bit tip 119a of the hammer bit 119. Further, the sliding guide 471 is utilized as a passage for transferring dust sucked through the suction part 561, downstream. In the other points, it has the same construction as the above-described third embodiment. Therefore, components in this embodiment which are substantially identical to those in the third embodiment are given like numerals as in the first embodiment, and they are not described or only briefly described. The suction part 561 is a feature that corresponds to the "suction part" in this invention.

Figure 24:
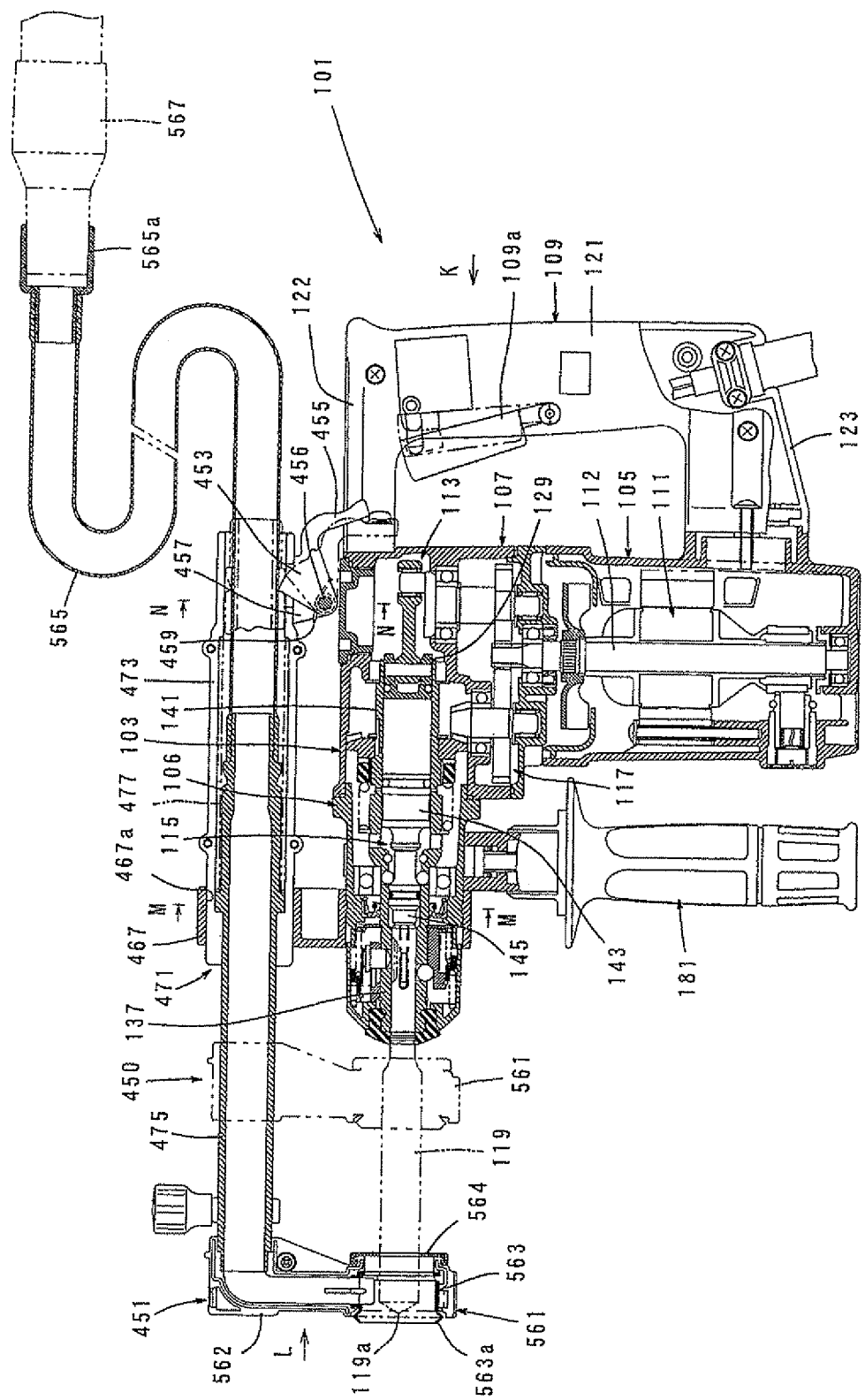
FIG. 24 is a sectional side view showing the entire structure of the hammer drill with a dust suction device according to a fourth embodiment of the invention.
Figure 25:
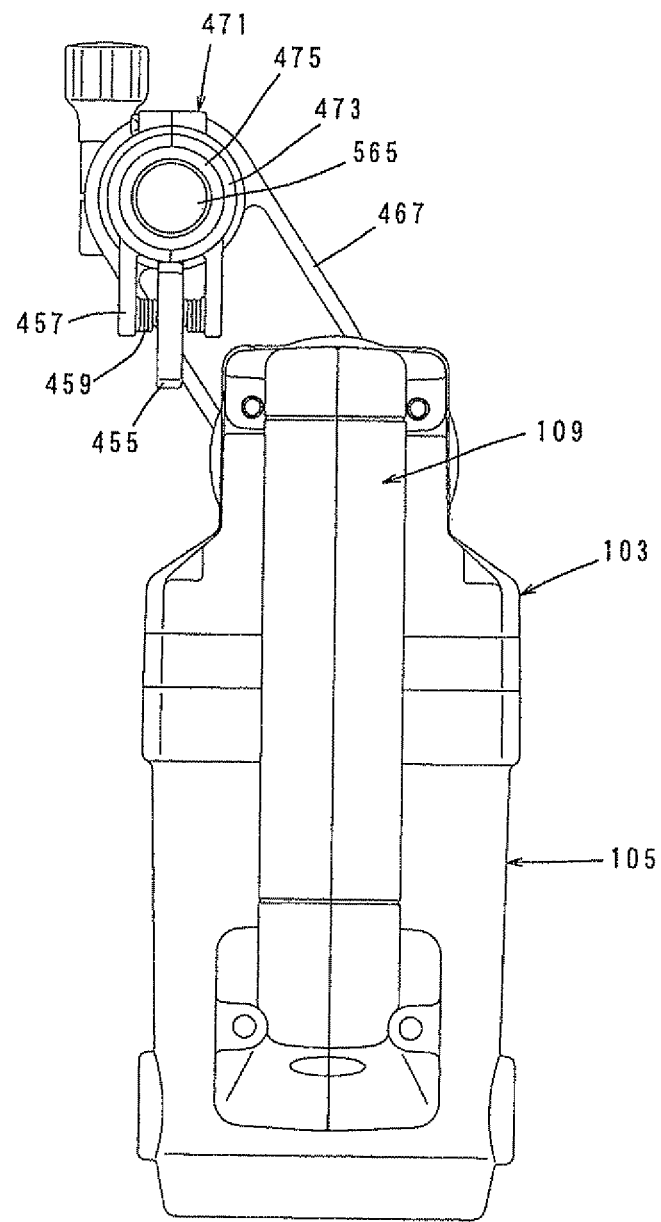
FIG. 25 is a view as viewed from the direction shown by the arrow K in FIG. 24.
Figure 26:
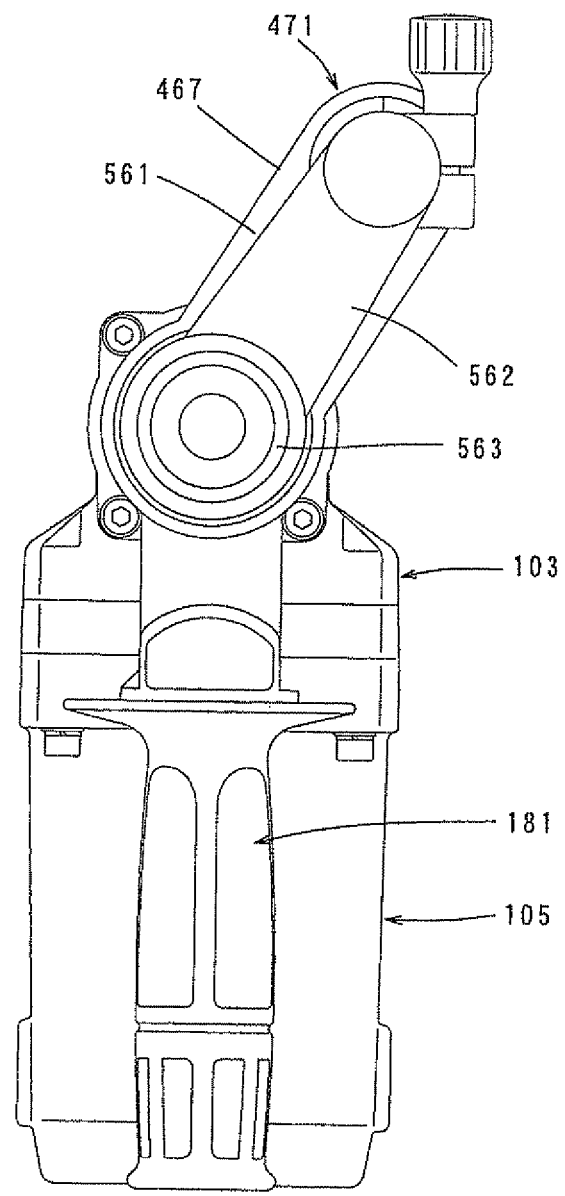
FIG. 26 is a view as viewed from the direction shown by the arrow L in FIG. 24.
Figure 27:
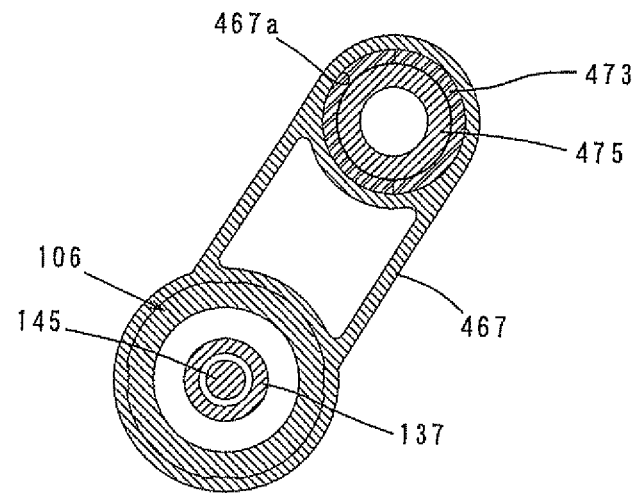
FIG. 27 is a sectional view taken along line M-M in FIG. 24.
Figure 28:
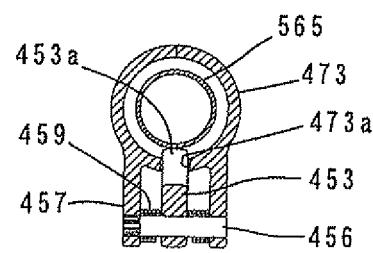
FIG. 28 is a sectional view taken along line N-N in FIG. 24.
Figure 29:
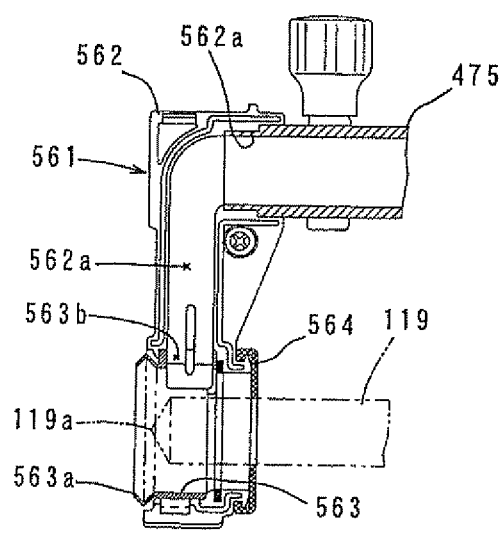
FIG. 29 is an enlarged sectional view showing the structure of a suction part in the fourth embodiment.

The suction part 561 in this embodiment has substantially the same construction as the suction part 255 in the above-described first embodiment. Specifically, as shown in FIGS. 24 and 29, the suction part 561 has a generally box-like suction part body 562 and a suction sleeve 563 for sucking dust which is provided on one end of the suction part body 562 in a direction transverse to the axial direction of the tool bit. A front end (left end as viewed in FIG. 29) of the suction sleeve 563 protrudes forward of a front end surface of the suction part body 562 and is open as a suction port 563*a*. During operation, the suction sleeve 563 is held in contact with a surface of the workpiece (surface to be worked) and sucks in dust. Further, a flexible material, for example, in the form of a rubber cover 564 is provided on a rear surface of the suction part body 562 (on a side opposite to the suction port 563*a* of the suction sleeve 563) and the hammer bit 119 extends through the rubber cover 564. The rubber cover 564 allows the hammer bit 119 to move in its axial direction with respect to the suction sleeve 563 while preventing dust sucked into the suction sleeve 563 from escaping out of the suction part body 562 by utilizing elastic deformation of the rubber cover 564. Dust sucked into the suction sleeve 563 is transferred to an internal space 562*a* of the suction part body 562 via a communication hole 563*b* formed in a side wall of the suction sleeve 563.

A mounting hole 562*b* is formed in the rear wall of the suction part body 562 on the side opposite to the suction sleeve 563 and the front end of the inner rail 475 of the sliding guide 471 is fitted into the mounting hole 562*b*, so that the suction part body 562 is connected to the inner rail 475. Specifically, the inner rail 475 moves in the axial direction of the hammer bit 119 together with the suction part body 562 while being guided by the outer rail 473. Further, like the above-described third embodiment, when the suction part 561 is moved to the rear position to expose the bit tip 119*a* of the hammer bit 119, the suction part 561 is locked in the rear position by engagement of the engagement protrusion 453*a* of the locking arm 453 with the engagement groove 475*a* of the inner rail 475 and this lock can be released by pressing the lock releasing lever 455 forward with the user's hand. Therefore, the locking arm 453 and the lock releasing lever 455 are features that correspond to the "locking member" and the "lock releasing member", respectively, in this invention. Further, the locking arm 453 and the lock releasing lever 455 form the "dust suction part locking mechanism" and the "operation mode switching mechanism" in this invention.

The inner rail 475 connected to the suction part body 562 has a tubular shape as described above, and its bore communicates with the internal space 562*a* of the suction part body 562. One end of an intermediate hose 565 is connected to a rear end of the inner rail 475, and a hose connecting port 565*a* to which a collecting hose 567 of a dust collector can be connected is formed on the other end of the intermediate hose 565. The bore of the inner rail 475 is a feature that corresponds to the "dust transfer passage" in this invention. Further, in this embodiment, the protruding support part 467 for supporting the outer rail 473 is mounted to the outer surface of the barrel 106 in front of the side grip 181 such that it can't move in the axial direction and the circumferential direction of the hammer bit.

This embodiment is constructed as described above. Therefore, when performing a drilling operation on a workpiece (such as a concrete wall), the user holds the handgrip 109 with one hand (right hand) and holds the suction part 561 and moves it rearward with the other hand (left hand). At this time, the inner rail 475 is moved rearward (retracted) while being guided by the outer rail 473. When the inner rail 475 is moved to the rear position in which the bit tip 119*a* is exposed to the outside, the engagement protrusion 453*a* of the locking arm 453 is engaged with the engagement groove 475*a* of the inner rail 475 and the inner rail 475 is locked in this rear position. This state is a feature that corresponds to the "second operation mode" in this invention. Thus, the user can visually check the position of the bit tip 119*a* and then position the bit tip 119*a* on a point of the workpiece to be drilled.

After positioning the bit tip 119*a*, when the inner rail 475 locked by the locking arm 453 is released by pressing the lock releasing lever 455 forward, the suction part 561 is, moved to the front position together with the inner rail 475 by the biasing force of the compression coil spring 477 and the suction port 463*a* is pressed against the surface of the workpiece. In this state, the suction part 561 is allowed to arbitrarily move between the front and rear positions. This state is a feature that corresponds to the "first operation mode" in this invention. In this state, when the trigger 109*a* is depressed, the hammer drill 101 is driven to perform a drilling operation by causing the hammer bit 119 to perform hammering movement in its axial direction and drilling movement in its circumferential direction. Dust generated by the drilling operation is sucked into the internal space 562*a* of the suction part body 562 through the suction port 463*a* and then led through the bore of the inner rail 475 and transferred to the dust collector via the intermediate hose 565 and the dust collecting hose 567.

As described above, according to this embodiment, positioning of the bit tip 119*a* on a point of the workpiece to be drilled can be made with the suction part 561 locked in the rear position. After the positioning, the lock is released to return the suction part 561 to the front position so that dust can be sucked by the suction part 561. Therefore, like in the first embodiment, the usability of the hammer drill 101 in drilling operation can be enhanced. Further, the user can operate both the trigger 109*a* and the lock releasing lever 455 with the hand holding the handgrip 109 or with one hand, so that the usability can be further enhanced.

Particularly, in this embodiment, the dust transfer passage is formed by utilizing the sliding guide 471 of the suction part 561, so that the dust collecting hose 567 of the dust collector can be disposed away from the workpiece. Therefore, the dust collecting hose is avoided from interfering with the drilling operation, which results in improvement of the usability of the hammer drill 101. Further, the sliding guide 471 has not only the function of guiding the movement of the suction part 561, but also the function of transferring dust, so that the number of parts can be reduced as compared with a construction in which parts required for these functions are separately provided.

Further, in the second and third embodiments, the dust suction sleeves 361, 463 are formed by the respective bellows-like tubular members such that they can extend and contract, but they may be changed to a telescopic structure in which a plurality of tubular members are connected together and can slide one into another in such a manner as to telescope.

Further, in the third and fourth embodiments, the lock releasing lever 455 is disposed in the vicinity of the handgrip 109, but it may be disposed in a grip part of the hammer drill other than the handgrip, such as the vicinity of the auxiliary handle in the form of the side grip 181, and the vicinity of the barrel 106. Furthermore, in the third and fourth embodiments, the locking arm 453 and the lock releasing lever 455 are formed in one piece, but the locking arm 453 and the lock releasing lever 455 may be formed as separate members which are interlocked by a linkage such as a lever and a rope. The illuminating means in the form of the lighting unit which is described in the first embodiment may be applied to the second to fourth embodiments.

Further, in the above-described embodiments, the hammer drill 101 is explained in which the hammer bit 119 performs hammering movement in the axial direction and drilling movement in the circumferential direction, but naturally, the invention can also be applied to a hammer in which the hammer bit 119 performs only hammering movement in the axial direction.

In view of the above-described invention, the following features can be provided.

(1)

"A dust transfer part comprises a telescopic dust transfer tubular member having an inner tube and an outer tube which are fitted one onto another in such a manner as to slide with respect to each other."

(2)

"In (1), a dust collecting hose extends into the outer tube and an extending end of the dust collecting hose is connected to one end of the inner tube."

(3)

"In (1) or (2), a front end of the dust suction part is detachably connected to the other end of the inner tube by fitting one onto the other."

(4)

"In a construction in which an operating part is operated to control a position of the front end of the dust suction part via a wire rope, the operating part can be selectively and detachably mounted to a plurality of operating part mounting regions on the tool body side including the grip part."

(5)

"The dust suction part has at least two mounting rods extending in the axial direction of the tool bit, and the mounting rods are removably inserted into mounting holes formed in the tool body so that the dust suction part is mounted to the tool body."

(6)

"The side handle has a grip body that can be mounted to a barrel cover and a grip part that is removably connected to the grip body, and the operating part of the operation mechanism part is mounted to a region of connection of the grip body with the grip part and can be removed from the grip body in a state in which the grip part is removed from the grip body."

(7)

"A locking member and a lock releasing member are formed in one piece."

(8)

"A guide part has an outer rail that is fixed to the tool body side and an inner rail that is slidably connected to the outer rail and moves together with the suction part, and extends in parallel to the axial direction of the tool bit at a distance from the tool bit."

(9)

"In (8), a locking member is provided on one end of the outer rail in the longitudinal direction and the suction part is locked in the second position by engagement of the locking member with the inner rail."

DESCRIPTION OF NUMERALS

101 hammer drill (power tool)
103 body
105 motor housing
106 barrel
106A barrel cover (grip part, barrel)
106*a* mounting hole
106*b* jut
107 gear housing
107A gear housing cover
109 handgrip (main handle, grip part)
109*a* trigger
111 driving motor
112 output shaft
113 motion converting mechanism
115 striking mechanism
117 power transmitting mechanism
119 hammer bit (tool bit)
119*a* bit tip
121 grip part
122 upper connection
123 lower connection
124 pivot
125 coil spring
129 piston
137 tool holder
141 cylinder
141*a* air chamber
143 striker
145 impact bolt
175 collecting hose
181 side grip (side handle, grip part)
182 grip body
182*a* fastening band
182*b* threaded control rod
182*c* engagement surface
183 grip part
183*a* nut
184 grip mounting part
185 through hole
186 dust suction unit mounting part
187 fixing screw
250 dust suction device
251 dust suction unit (dust suction part)
253 operation mechanism
255 suction part
257 transfer part (dust transfer part)
261 suction part body
261*a* internal space
262 suction sleeve
262*a* suction port
262*b* communication hole
263 rubber cover
264 telescopic dust transfer tubular member
264A inner tube
264B outer tube
264*a* outer flange
264*b* inner flange
264*c* guide groove
265 fixing screw
266 compression coil spring
267 lighting unit
268 bracket
268*a* mounting rod
269 connecting bolt
270 operating part
271 operating lever
271A operating lever
272 rotary ring
272*a* engagement recess 272b guide groove
273 wire rope
273a inner wire
273b outer tube
274 spherical engagement part
275 slide ring
275a engagement recess
275b protrusion
277 ring housing
277a boss
350 dust suction device
351 dust suction unit (dust suction part)
355 suction part
357 transfer part (dust transfer part)
361 dust suction sleeve
361a dust suction port
362 passage
363 fixed sleeve (fixed part)
364 front end cylindrical portion
365 movable sleeve
366 flange
367 mounting rod
369 guide rod (guide rail)
371 sliding cylindrical part (slider)
372 seal ring
373 compression coil spring
375 stopper member
377 transfer pipe
378 pipe joint
379 internal transfer tube
450 dust suction device
451 dust suction unit (dust suction part)
453 locking arm (locking member)
453a engagement protrusion
455 lock releasing lever (lock releasing member)
456 support shaft
457 arm mounting part
459 torsion spring
461 fixed sleeve (fixed part)
463 dust suction sleeve (suction part)
463a suction port
465 dust discharge nozzle
466 cap
467 protruding support part
467a through hole
469 ring member
469a projection
469b mounting hole
471 sliding guide (guide part)
473 outer rail
473a opening
475 inner rail
475a engagement groove
477 compression coil spring
561 suction part
562 suction part body
562a internal space
562b mounting hole
563 suction sleeve
563a suction port
563b communication hole
564 rubber cover
565 intermediate hose
565a intermediate hose connecting port
567 dust collecting hose

The invention claimed is:

1. A power tool, which performs a predetermined operation by using a tool bit, comprising:
    at least one grip part,
    a dust suction device,
        wherein the dust suction device has a dust suction part that sucks and collects dust generated during operation at a tip of the tool bit, and the dust suction part can be moved between a first position in which the dust suction part covers at least a bit tip of the tool bit and a second position in which the bit tip is exposed to an outside environment prior to the operation, and is biased so as to be normally placed in the first position, and
    an operation mode switching mechanism that is capable of switching between a first operation mode in which the dust suction part placed in the first position is allowed to move between the first and second positions and a second operation mode in which the dust suction part moved from the first position to the second position is locked in the second position,
    wherein the operation mode switching mechanism is provided in a region of the grip part or its vicinity such that the operation mode switching mechanism can be operated with a user's hand holding the grip part,
    the operation mode switching mechanism comprises an operating part and a wire rope that transmits movement of the operating part to the dust suction part,
    the operating part is configured to move between i) a first operation position in which the dust suction part is allowed to move between the first position and the second position and ii) a second operation position in which the dust suction part is moved from the first position to the second position and is locked in the second position, and the first operation mode is selected when the operating part is placed in the first operation position, while the second operation mode is selected when the operating part is placed in the second operation position, and
    when the operating part is moved from the first operating position to the second operating position, the wire rope is moved by the movement of the operation part, and thereby the dust suction part is moved from the first position to the second position by movement of the wire rope.

2. The power tool as defined in claim 1, wherein the operation mode switching mechanism comprises a dust suction part locking mechanism having a locking member which locks the dust suction part moved from the first position to the second position in the second position and a lock releasing member which releases the lock of the locking member, and wherein the second operation mode is selected when the locking member locks the dust suction part moved from the first position to the second position in the second position, and the first operation mode is selected when the lock releasing member of the lock releasing mechanism is operated to release the lock.

3. The power tool as defined in claim 2, comprising a motor for driving the tool bit, wherein a motor operating member for starting and stopping the motor is provided on the grip part, and the motor operating member is disposed adjacent to the lock releasing member.

4. The power tool as defined in claim 2, comprising a power tool body, wherein the dust suction part includes a suction part formed by a tubular member which entirely covers the tool bit and can extend and contract in the axial direction of the tool bit, a fixed part that is mounted to the front end region of the power tool body and to which the suction part is connected, and a guide part that guides the extending and contracting movement of the suction part, and wherein the suction part moves between the first and second positions by extending and contracting while being guided by the guide part.

5. The power tool as defined in claim 2, wherein the dust suction part has a suction part that covers only the bit tip and moves between the first and second positions, and a guide part that extends in parallel to the tool bit at a distance from the tool bit and guides the movement of the suction part.

6. The power tool as defined in claim 5, wherein a dust transfer passage for transferring dust sucked into the suction part downstream is formed within the guide part.

7. The power tool as defined in claim 1, comprising a power tool body, wherein the grip part comprises a side handle attached to the power tool body transversely to an axial direction of the tool bit, and the operation mode switching mechanism is disposed in a region of the side handle or its vicinity such that the operation mode switching mechanism can be operated with a user's hand holding the side handle.

8. The power tool as defined in claim 1, comprising a power tool body, wherein the grip part comprises a main handle attached to the power tool body on the side opposite to the tool bit, and the operation mode switching mechanism is disposed in a region of the main handle or its vicinity such that the operation mode switching mechanism can be operated with a user's hand holding the main handle.

9. The power tool as defined in claim 1, comprising a power tool body, wherein the grip part comprises a cylindrical barrel integrally formed on a front end of the power tool body, and the operation mode switching mechanism is disposed in a region of the barrel or its vicinity such that the operation mode switching mechanism can be operated with a user's hand holding the barrel.

10. The power tool as defined in claim 1, comprising a power tool body, wherein the dust suction part and the operation mode switching mechanism are assembled together into a dust suction assembly, and the dust suction assembly can be detachably mounted to the power tool body.

11. The power tool as defined in claim 1, wherein the dust suction part has a suction part that sucks dust while covering the bit tip and a hollow dust transfer part that is connected to the suction part and extends parallel to the tool bit at a distance from the tool bit.

12. The power tool as defined in claim 1, comprising a power tool body, wherein the dust suction part has a suction part that covers the tool bit and a fixed part that is mounted to the power tool body, and the suction part is mounted to the fixed part via a sliding part such that the suction part can slide in the axial direction of the tool bit.

13. The power tool as defined in claim 12, wherein the suction part comprises a bellows-like tubular member which has a predetermined length in the longitudinal direction and can extend and contract in the axial direction of the tool bit, and the suction part slides with respect to the fixed part via the sliding part while maintaining the predetermined length in the longitudinal direction.

14. The power tool as defined in claim 12, wherein the sliding part includes a main guide part and at least one auxiliary guide part, the main guide part comprising a combination of a movable cylindrical element which is provided on one end of the suction part in the longitudinal direction and a fixed part side cylindrical part which is formed on the fixed part and onto which the movable cylindrical element is slidably fitted, and the auxiliary guide part comprising a combination of a guide rail extending in the axial direction of the tool bit and a slider which can slide with respect to the guide rail, and wherein the auxiliary guide part is disposed in parallel to the main guide part and the wire rope is connected to the auxiliary guide part.

15. The power tool as defined in claim 14, wherein the suction part and the movable cylindrical element are formed as separate members, a wire stopper having a larger diameter than the wire rope is provided on an end of the wire rope, the movable cylindrical element has a large-diameter hole through which the wire stopper is allowed to pass and a small-diameter hole through which the wire stopper is not allowed to pass, the wire stopper passed through the large-diameter hole is led into the small-diameter hole and then the end of the wire rope is fixed to the movable cylindrical element, and when the suction part is mounted onto the movable cylindrical element, the suction part faces the large-diameter hole, so that the wire stopper is prevented from moving from the small-diameter hole to the large-diameter hole.

16. The power tool as defined in claim 1, wherein the dust suction part is provided with an illuminating optical member for lighting the bit tip which is exposed through the dust suction part.

17. The power tool as defined in claim 16, wherein the illuminating optical member is turned off when the dust suction part is placed in the first position and turned on when the dust suction part is placed in the second position.

* * * * *